United States Patent [19]
Taroda et al.

[11] Patent Number: 5,682,272
[45] Date of Patent: Oct. 28, 1997

[54] DISK DRIVE AND METHOD FOR RETRYING A READ OPERATION UPON DETECTING A READ ERROR

[75] Inventors: Yuichi Taroda; Shuichi Hashimoto, both of Kawasaki, Japan

[73] Assignee: Fujitsu Limited, Kawasaki, Japan

[21] Appl. No.: 422,524

[22] Filed: Apr. 14, 1995

[30] Foreign Application Priority Data

Apr. 15, 1994 [JP] Japan ..................... 6-077023

[51] Int. Cl.$^6$ ....................................... G11B 5/09
[52] U.S. Cl. ................................. 360/53; 360/66
[58] Field of Search ........................ 360/46, 53, 66

[56] References Cited

U.S. PATENT DOCUMENTS 5,189,566  2/1993  Christensen et al. ............... 360/53
5,461,517  10/1995  Suda et al. ..................... 360/66 X

FOREIGN PATENT DOCUMENTS 1253802  10/1989  Japan .
1263903  10/1989  Japan .
 581604   4/1993  Japan .

*Primary Examiner*—Aristotelis M. Psitos
*Assistant Examiner*—Alan Faber
*Attorney, Agent, or Firm*—Greer, Burns & Crain, Ltd.

[57] ABSTRACT

In a disk drive and a method for retrying to check data in the disk drive, a magnetic disk subsystem comprises a magnetic disk control unit and a drive module. The magnetic disk control unit is provided with a unit for controlling data check retry sequence which has a dummy write control unit. The drive module is provided with heads and a positioning unit. When the data read from the medium contain error, the above unit controls the data check retry sequence in order to read again the data using the same head. The dummy write control unit seeks a dummy write cylinder during the data check retry sequence, effects the dummy writing, seeks the original cylinder again, and reads the data again.

15 Claims, 14 Drawing Sheets

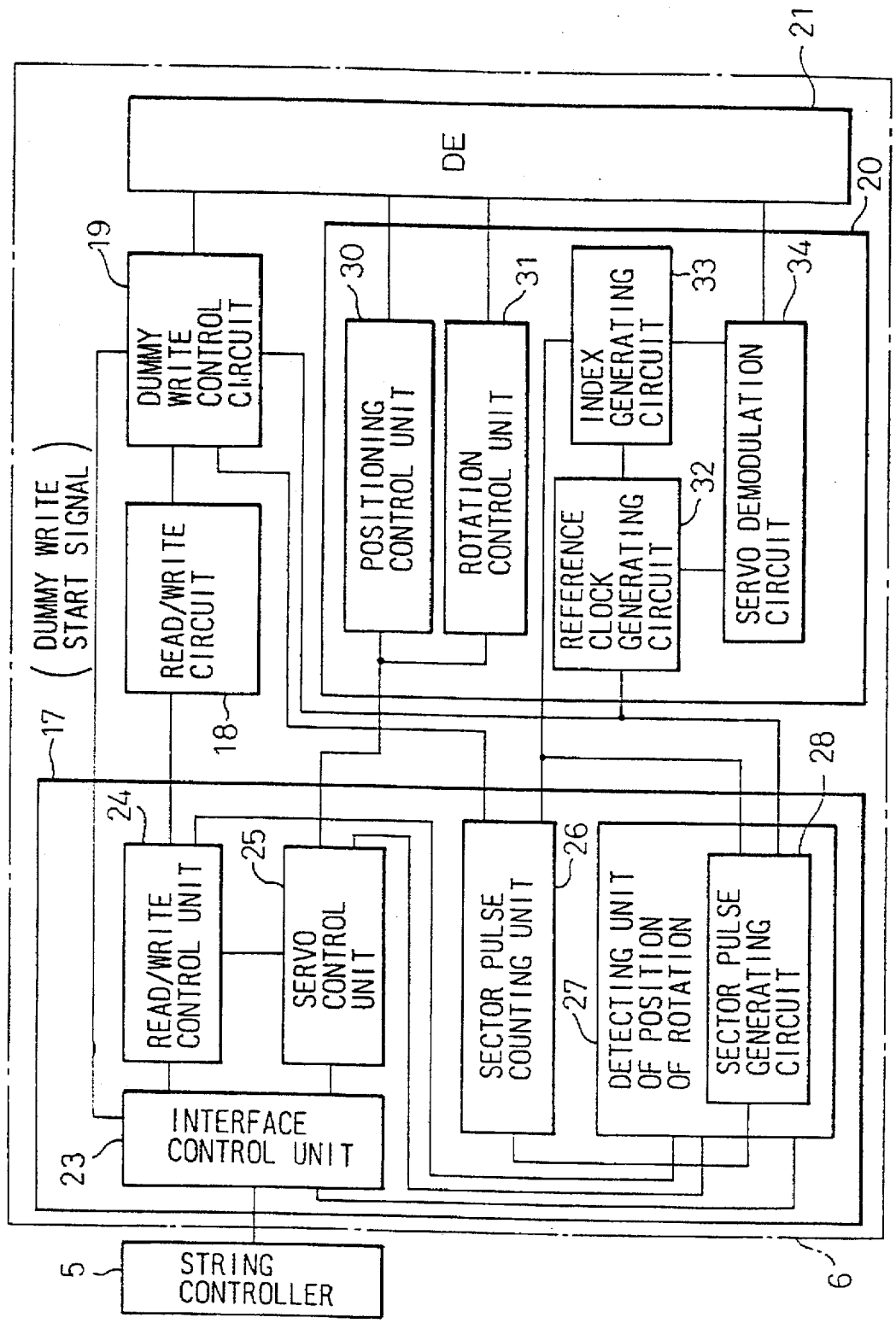

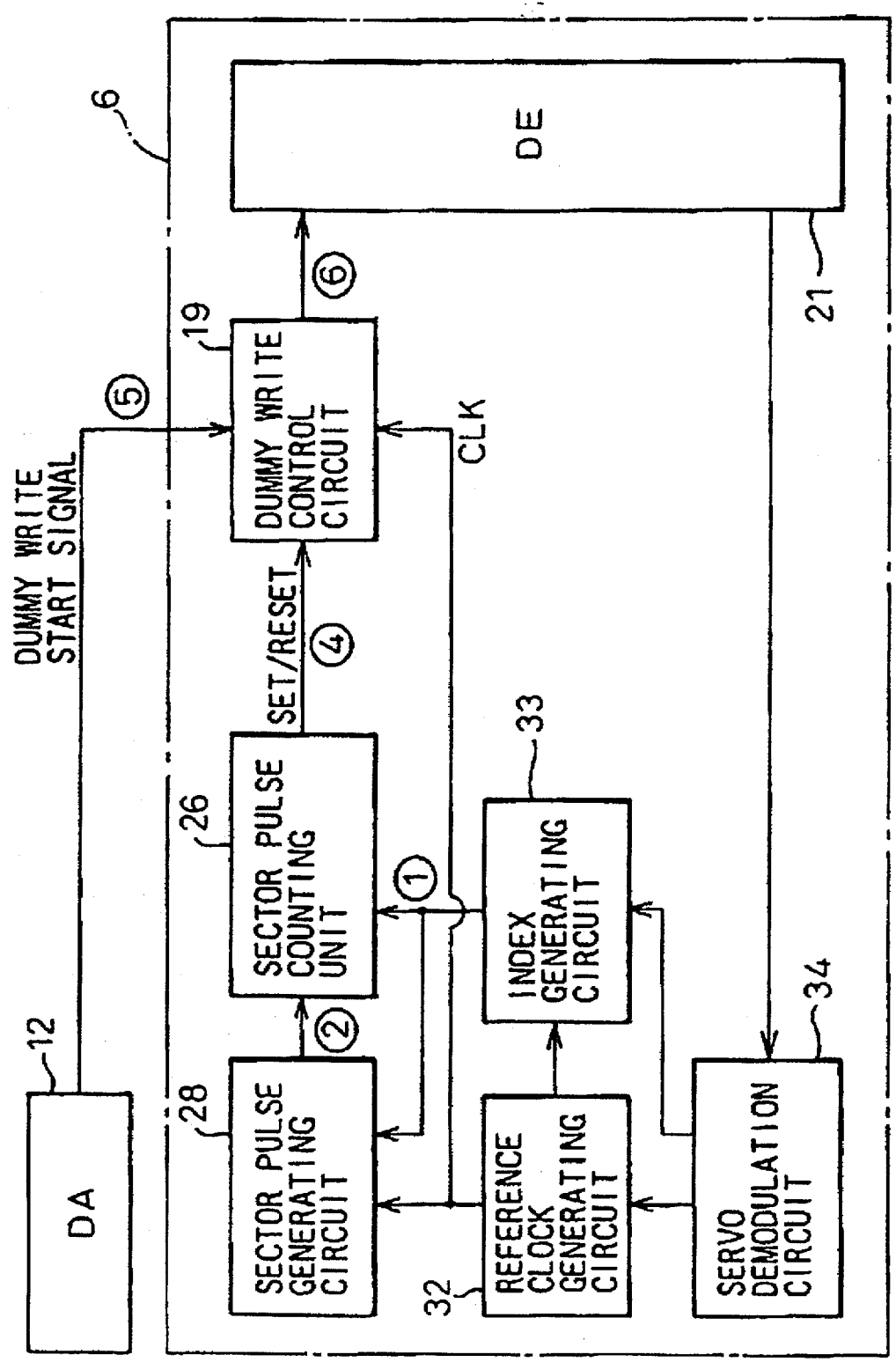

DISK DRIVE AND METHOD FOR RETRYING A READ OPERATION UPON DETECTING A READ ERROR

BACKGROUND OF THE INVENTION

1. Field of the Invention

The present invention relates to a disk drive that can be used in a magnetic disk subsystem (or a magnetic disk drive) and a method for retrying to check data therein.

2. Description of the Related Art

The magnetic subsystem (or the magnetic disk drive) will be described first.

In the conventional magnetic disk subsystems (or magnetic disk drives), the data have been read from, or written into, a medium using a magnetic head (hereinafter simply referred to as "head"). The head called MR head (head utilizing a magneto-resistance effect) has heretofore been known as the head of this type.

The MR head is equipped with an inductive write element and a read element made up of an MR element, the write element writing data into the medium and the read element reading the data from the medium.

In the MR head, furthermore, the write element and the read element are arranged neighboring each other, the write element having a coil for supplying a current and a core for constituting a magnetic path.

In the MR head, when the data are repetitively written into the medium, magnetic distortion occurs in the surrounding core, and the data are no longer correctly read by the write element.

That is, the read element reads the data from the medium by changing the resistance of the MR element depending upon the magnetization data of the medium. Therefore, when the magnetic distortion occurs in the core surrounding the write element to magnetically affect the MR element of the read element, the read process is no longer correctly carried out by the read element.

In the disk drive using the MR head as described above, read error often occurs while reading the data. In such a case, so far, the process of data check retry sequence is repeated a predetermined number of times (N times). When the data is not read out even after the above process, the data is deemed to be a permanent error (error).

PROCESS FOR RETRYING TO CHECK THE DATA—SEE FIG. 1

FIG. 1 is a flowchart of a conventional process for retrying to check the data. The conventional process of data check retry sequence will now be described with reference to FIG. 1.

This process, i.e., data check retry process is used to control the magnetic disk controller in a magnetic disk subsystem constituted by, for example, a drive module and the magnetic disk controller which controls the drive module, wherein S1 to S5 represent processing steps.

First, the magnetic disk controller determines whether or not the number of times of retrial has exceeded a predetermined number of times (S1). when the predetermined number of times has not been exceeded, the magnetic disk controller tries the read process (read operation) again (S2) and determines whether or not the read operation is finished successfully (S3).

When the read operation is finished successfully, the retry process is finished. When the read operation is not successful, a value of a counter for counting the number of times of retrial i.e., a retry counter is increased (N=N+1) (S4) and the procedure is repeated from the process of S1.

When the value of the retry counter reaches the predetermined number of times (S1), a host device is informed of an error (permanent error) (S5), and the retry process is finished.

When the permanent error has occurred, such an error will take place again if the data are read out, and the process cannot be continued. According to the prior art, therefore, the head is positioned on a particular cylinder and the write current flows into the head to write the data (dummy writing). This process enables the head to return to the normal state.

The above-mentioned prior art, however, involves the following problems.

(1) In the magnetic disk subsystem (or magnetic disk drive) equipped with a head (MR head) which has an inductive write element and a read element made up of an MR element, the data are often erroneously read due to magnetic distortion that occurs at the time of writing the data.

In such a case, the data check retry process is repeated a predetermined number of times, and when the data is not read out even after the above process, the data is deemed to be a permanent error. Therefore, the subsequent process cannot be correctly carried out.

(2) When the data are to be written into the medium, the head is positioned on a desired cylinder and the data are written by the write element of the head. In this case, however, the ID portion written in the medium must be read out to make sure that the head has been accurately positioned.

As described above, however, when it happens that the data are not properly read by the read element, the ID portion cannot be read, either. It is not, therefore, allowed to make sure the position of the head and the subsequent writing operation is not carried out.

(3) When the head is no longer capable of reading the data and it is determined that a permanent error has occurred, dummy writing is effected to return the head to the normal state. Such a process, however, is carried out separately from ordinary process, and is complex and requires extended periods of processing time.

SUMMARY OF THE INVENTION

A main object of the present invention, therefore, is to solve the above-mentioned problems inherent in the prior art and to make it possible to reliably confirm the position of the head by readily executing a dummy write process in the case where the data are no longer correctly read out from the medium by the data read process, and by recovering the head into the normal state.

A further object of the present invention is to simplify the read/write process in the disk drive by providing a dummy write sequence in the data check retry sequence.

In order to solve the above-mentioned problems, the disk drive of the present invention comprises:

a head for writing data into, and reading data from, a medium;

positioning means for placing the head at a desired position on the medium; and data check retry sequence control means which controls a data check retry sequence for reading the data again using the same head when the data are not correctly read out from the medium in the data read process.

In the disk drive of the present invention, furthermore, the data check retry sequence control means is provided with dummy write means which carries out dummy writing of predetermined data by seeking a predetermined dummy write cylinder during the data check retry sequence, and reads the data again by seeking the original cylinder.

In the disk drive of the present invention, desirably, the data check retry sequence control means is provided with position confirmation control means, which changes a given head (#1) over to another head (#0) that is positioned on the same cylinder as the dummy write cylinder to read the ID portion from the medium using the head (#0) after the head is changed, in order to make sure whether or not a given head (#1) has been positioned on the dummy write cylinder.

In the disk drive of the present invention, more desirably, the data check retry sequence control means is provided with head recovery confirmation means which causes the head (#1) that is the object of dummy writing of the data to read the ID portion of the dummy write cylinder in order to make sure that the head has normally recovered.

In the disk drive of the present invention, more desirably, the data check retry sequence control means is provided with dummy write repeat control means which, when the ID portion is not normally read out as a result of reading the ID portion of the dummy write cylinder using the head (#1) that is the object of dummy writing of the data, carries out the dummy writing again into the same head and repeats the dummy writing until the ID portion is normally read out.

In the disk drive of the present invention, more desirably, the data check retry sequence control means is provided with dummy write start control means which sets a plurality of numbers of times of starting dummy writing, counts the number of times of data check retry during the data check retry sequence, and starts the dummy writing when the counted numbers of times have reached the numbers of times of starting the dummy writing.

In the disk drive of the present invention, more desirably, the data check retry sequence control means is provided with empty read instruction issuing means which, when the dummy writing is effected, issues empty read instructions so as not to destroy the ID portion of the dummy write cylinder.

In the disk drive of the present invention, more desirably, the data check retry sequence control means is provided with head switch instruction issuing means which, when the dummy writing is effected, issues a head switch instruction to change over the head so as not to destroy the ID portion of the dummy write cylinder.

In the disk drive of the present invention, more desirably, the data check retry sequence control means is provided with write command issuing means exclusively for dummy writing which, when the dummy writing is effected, issues a write command (dummy write start signal) exclusively for dummy writing, for which the ID portion needs not be read out, so as not to destroy the ID portion of the dummy write cylinder. In a method for retrying to check data in a disk drive which comprises a head for writing data into, and reading data from, a medium, positioning means for placing the head at a desired position on the medium, and data check retry sequence control means which controls a data check retry sequence for reading the data again using the same head when the data are not correctly read out from the medium in the data read process, predetermined data are written in dummy writing by seeking a predetermined dummy write cylinder during the data check retry sequence, and the data are read again by seeking the original cylinder.

In the method for retrying to check data of the present invention, desirably, the data check retry sequence changes a given head (#1) over to another head (#0) that is positioned on the same cylinder as the dummy write cylinder to read the ID portion from the medium using the head (#0) after the head is changed, in order to make sure whether or not a given head (#1) has been positioned on the dummy write cylinder.

In the method for retrying to check data of the present invention, more desirably, the data check retry sequence causes the head (#1) that is the object of writing of the data to read the ID portion of the dummy write cylinder in order to make sure whether or not the head (#1) has normally recovered.

In the method for retrying to check data of the present invention, more desirably, when the ID portion is not normally read out as a result of reading the ID portion of the dummy write cylinder using the head (#1) that is the object of dummy writing of the data, the data check retry sequence effects the dummy writing again into the same head (#1) and repeats the dummy writing until the ID portion is normally read out.

In the method for retrying to check data of the present invention, more desirably, the data check retry sequence sets a plurality of numbers of times of starting dummy writing, counts the number of times of data check retries during the data check retry process, and starts the dummy writing when the counted numbers of times have reached the numbers of times of starting the dummy writing.

In the method for retrying to check data of the present invention, more desirably, empty read instructions are issued, so that the ID portion of the dummy write cylinder is prevented from being destroyed by the dummy writing.

In the method for retrying to check data of the present invention, more desirably, a head switching instruction is issued for changing over the head, so that the ID portion of the dummy write cylinder is prevented from being destroyed by the dummy writing.

In the method for retrying to check data of the present invention, more desirably, a write command (dummy write start signal) exclusively for dummy writing for which the ID portion needs not be read but is issued so that the ID portion of the dummy write cylinder will not be destroyed when the dummy writing is effected.

In the method for retrying to check data of the present invention, more desirably, the dummy write sequence is controlled based on the write command (dummy write start signal) exclusively for dummy writing and based on the sector position data of the medium, so that the ID portion will not be destroyed when the dummy writing is effected.

The present invention described above provides the following advantages.

(1) Even when the data are not correctly read out from the medium by the data read process (data read operation), the dummy write process (dummy write operation) is executed to remove magnetic distortion from the head so that the head is recovered to the normal state.

Here, when the data are to be written into the medium, the head is, first, positioned on a desired cylinder and the data are written using the write element of the head. In this case, first, the ID portion written in the medium must be read out by the read element to make sure whether or not the head has been accurately positioned.

In the case where it happens that the data are not properly read by the read element, however, the ID portion is not read out, either. Therefore, the position of the head is not confirmed and the subsequent writing operation is not carried out.

In such a case according to the present invention, the dummy write sequence is executed to recover the head in which the characteristics have deteriorated. Therefore, the ID portion is reliably read and the subsequent writing operation is carried out. It does not happen, either, that the data in other area are inadvertently destroyed.

(2) Since the dummy write sequence is executed during the data check retry sequence, there is no need for providing a sequence exclusively for dummy writing and the process can be simplified.

(3) At the time of effecting the dummy writing, the ID portion of the dummy write cylinder is prevented from being destroyed. Therefore, improved reliability of the apparatus can be expected.

(4) The dummy writing is effected by using a predetermined exclusive cylinder and does not destroy the user data.

(5) In order to make sure whether or not the head for effecting the dummy writing has been positioned on the dummy write cylinder, the head is changed over to another head that has been positioned on the same cylinder as the dummy write cylinder, and the ID portion is read out from the medium using the changed head after the head is changed.

Accordingly, even when the characteristics of one head have deteriorated, the ID portion is read out using another head making it possible to reliably make sure the position of the head.

(6) After the dummy writing, the ID portion of the dummy write cylinder is read out using the head that has effected the dummy writing to make sure that the head has normally recovered. Thus, recovery of the head is easily confirmed without affecting the user data.

(7) After the dummy writing, the ID portion of the dummy write cylinder is read out using the head that has effected the dummy writing. In the case where the ID portion is not correctly read out, the dummy writing is effected again using the same head- The dummy writing is repeated until the ID portion is normally read out.

Therefore, the head can be reliably recovered even when it is not recovered by one time of dummy writing.

(8) Plural numbers of times of starting dummy writing are set to start the dummy write process, the numbers of times of data check retry are counted in the step of data check retry process, and the dummy writing is effected when the counted numbers of times have reached the numbers of times of starting the dummy writing.

Therefore, the head is recovered at an increased probability, and the process for recovering the head is carried out efficiently and quickly.

(9) By issuing empty read instructions, the ID portion of the dummy write cylinder is guarded so as not to be destroyed by the dummy writing. Therefore, there is no need for particularly changing or adding hardware, and the ID portion can be easily guarded by simply adding firmware (or software).

(10) A head switch instruction is issued to change over the head, and the ID portion of the dummy write cylinder is guarded so as not to be destroyed by the dummy writing. Accordingly, there is no need for particularly changing or adding hardware, and the ID portion can be easily guarded by simply adding firmware.

(11) By issuing a write command (dummy write start signal) exclusively for the dummy writing for which the ID portion needs not be read out, the ID portion of the dummy write cylinder is guarded so as not to be destroyed by the dummy writing.

The exclusive command may be issued at any timing and the period of dummy writing can be freely set, enabling the ID portion to be guarded more reliably.

(12) The dummy write sequence is controlled based upon the write command (dummy write start signal) exclusively for the dummy writing and upon the sector position data of the medium and, hence, the ID portion is guarded so as not to be destroyed.

Accordingly, the period of dummy writing can be freely set, and the ID portion can be guarded more reliably.

BRIEF DESCRIPTION OF THE DRAWINGS

The above object and features of the present invention will be more apparent from the following description of the preferred embodiments with reference to the accompanying drawings, wherein:

FIG. 4 is a block diagram of a drive module according to the preferred embodiment of the present invention;

FIG. 10 is a diagram (No. 2) for explaining the dummy write process according to the preferred embodiment of the present invention;

DESCRIPTION OF THE PREFERRED EMBODIMENTS

Hereinafter, the description of some preferred embodiments according to the present invention will be given with reference to the accompanying drawings.

Figure 1:
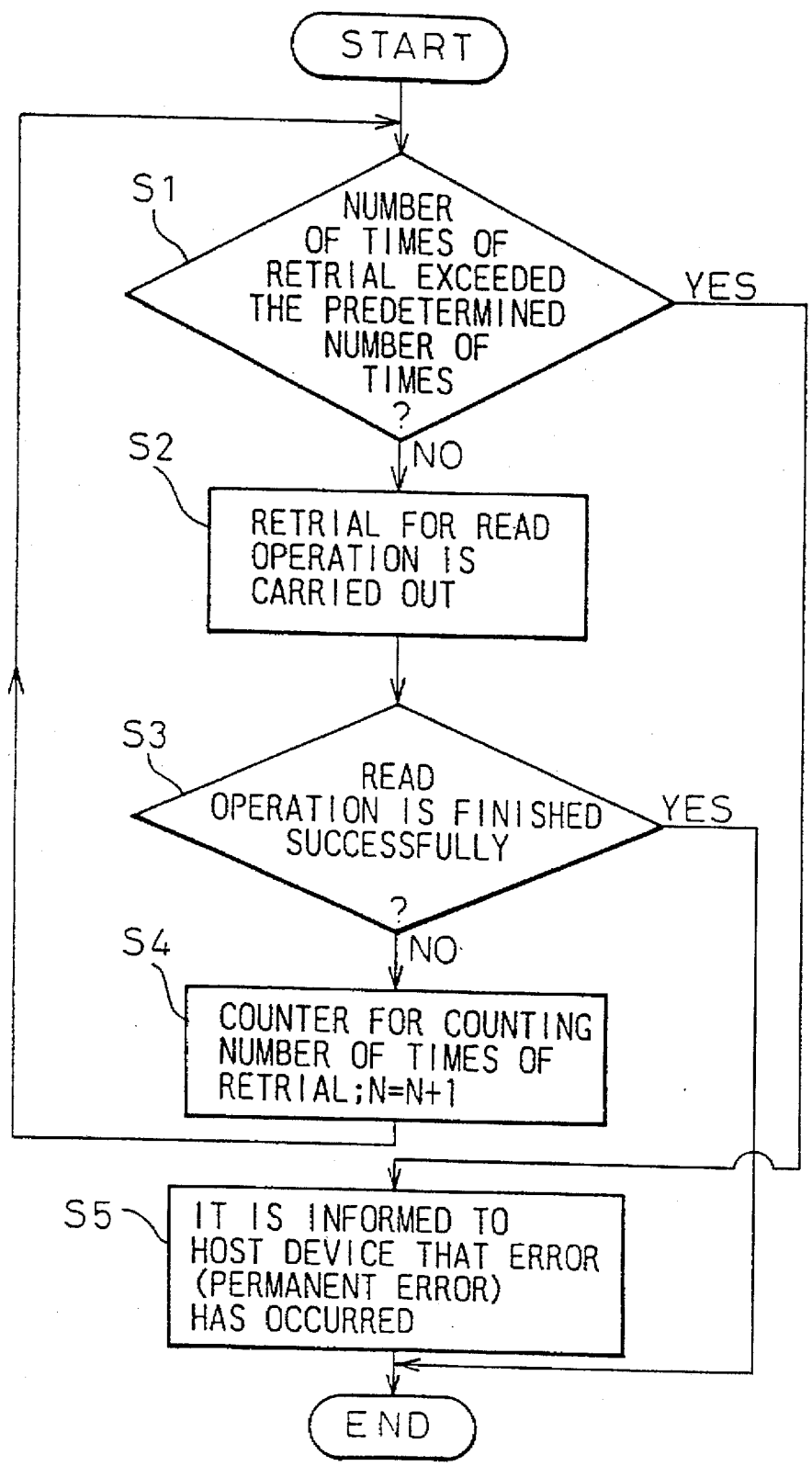
FIG. 1 is a flowchart of a conventional data check retry process.
Figure 2:
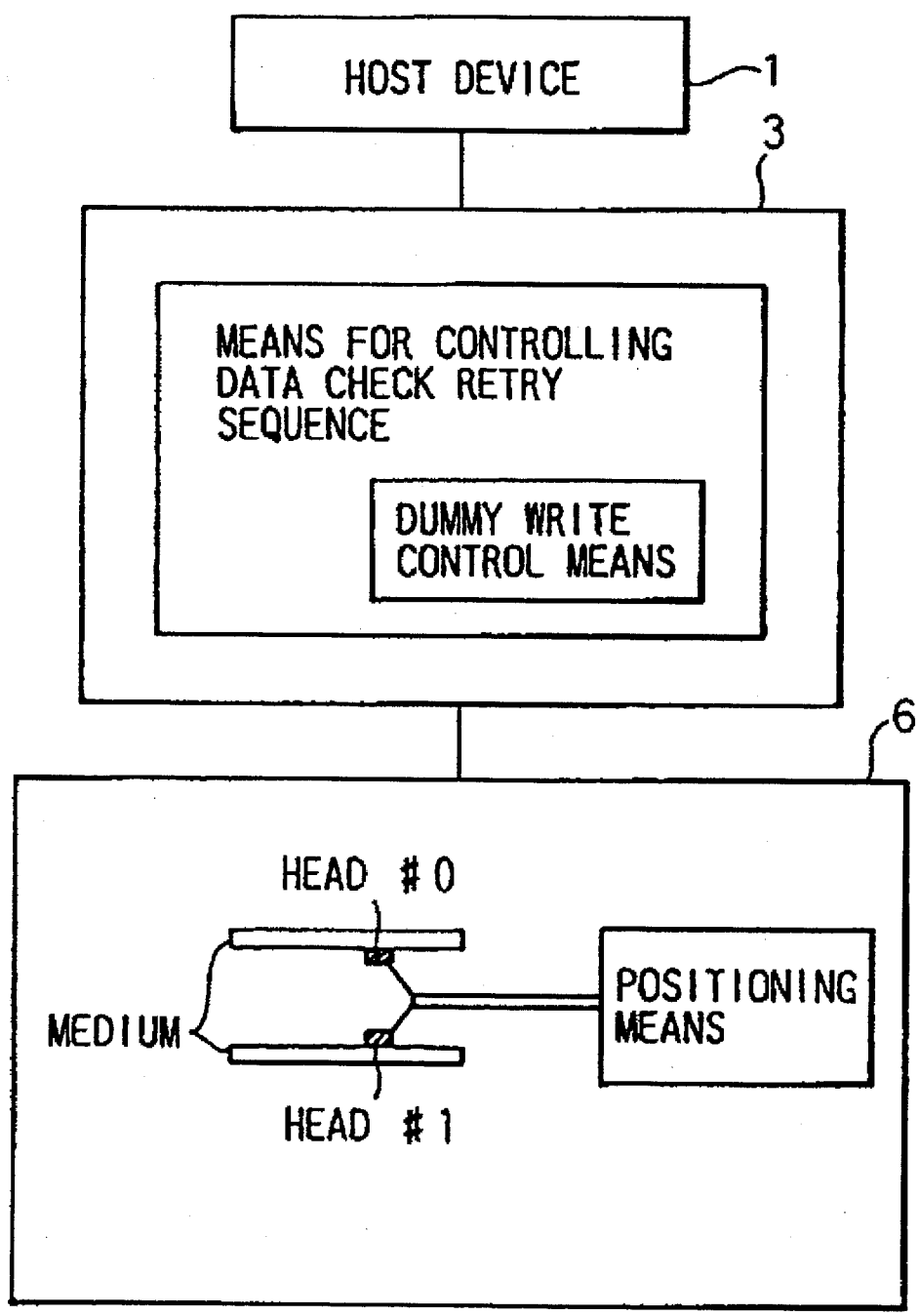
FIG. 2 is a block diagram illustrating a fundamental embodiment based on a basic principle of the present invention.

FIG. 2 is a block diagram illustrating a fundamental embodiment based on a basic principle of the present invention, wherein reference numeral 1 denotes a host device (i.e., host computer), 3 denotes a magnetic disk controller, and 6 denotes a drive module (or drive modules).

As shown in FIG. 2, a magnetic disk subsystem of the present invention includes the magnetic disk controller connected to the host device 1 and the drive module 6. Further, the magnetic disk controller 3 is provided with means (MPU) for controlling a data check retry sequence which has dummy write control means.

Furthermore, the drive module 6 is equipped with heads (heads #0 and #1) for writing data into, and reading data from, a medium and with positioning means for placing the heads at desired positions on the medium.

When the data are not correctly read out from the medium in the data read process, the data check retry sequence control means controls the data check retry sequence in order to read out &he data again using the same head.

In the dummy write control means, predetermined data are written in dummy writing by seeking a predetermined dummy write cylinder during the data check retry sequence, and the data are read out again by seeking the original cylinder again.

Operation of the present invention based on the above-mentioned constitution will now be described with reference to FIG. 2.

When read error (in data check process) occurs in the read process instructed to the drive module 6, the data check retry sequence control means executes the process of data check retry sequence.

In this case, the data check retry sequence control means gives an instruction to the drive module 6 to execute the data read process until the process for correctly reading the data is finished within a predetermined number of times.

When the read process is not successful after the data check retry sequence is tried a given number of times, a dummy write command is issued to change the state of the head by positioning it on a dummy write cylinder (seeking operation) that has been prepared in advance in the magnetic disk of the drive module 6 relying on the control by the dummy write control means, and the dummy write process is executed.

After the dummy write process is finished, the head is positioned on the original cylinder (seeking operation), and the process is returned back to the original retry sequence for checking the data.

In the process for reading the data written in the magnetic disk of the drive module 6, the data check retry sequence is executed when it is not allowed to correctly read the data. Here, however, a predetermined dummy write cylinder is sought during the data check retry sequence, the data are written (dummy writing), and the head is recovered to the normal state by changing the state of the head.

In this case, a current of a given frequency is supplied to the head which deteriorates in its characteristics for a predetermined period of time during the dummy writing, and magnetic distortion is removed so that the head is recovered to carry out its normal reading operation. In the dummy writing, however, no data is allowed to be written into the ID portion of the dummy write cylinder. That is, the data are written into any portions other than the ID portion.

As described above, the dummy write process is carried out even when the data are no longer correctly read out from the medium by the data read process, and the head is recovered to the normal state and is positioned to an accurate position.

Furthermore, since the dummy write sequence is executed during the data check retry sequence, there is no need for providing a sequence exclusively for the dummy writing and the read/write process can be simplified.

Concrete embodiments of the present invention will now be described with reference to the drawings.

FIGS. 3 to 14 are diagrams illustrating an embodiment of the present invention, wherein reference numeral 1 denotes a host device; 2 denotes a magnetic disk subsystem; 3 denotes a magnetic disk controller; 5 denotes string controllers; 6 denotes drive modules; 9 denotes channel adapters (CA); 10 denotes a resource manager (RM); 11 denotes service adapters (SA); 12 denotes device adapters (DA); 14 denotes magnetic disk drives; 17 denotes a logic circuit; 18 denotes a read/write circuit; 19 denotes a dummy write control circuit; 20 denotes a servo circuit; 21 denotes a disk enclosure (hereinafter referred to as "DE"); 23 denotes an interface control unit; 24 denotes a read/write control unit; 25 denotes a servo control unit; 26 denotes a sector pulse counting unit; 27 denotes a detecting unit of position of rotation; 28 denotes a sector pulse generating circuit) 30 denotes a positioning control unit; 31 denotes a rotation control unit; 32 denotes a reference clock generating circuit; 33 denotes an index generating circuit; 34 denotes a servo demodulation circuit; 37 denotes a microprocessor (hereinafter referred to as "MPU"); 38 denotes a memory unit; 39 denotes a buffer (buffer memory unit); 43 denotes a spindle; 44 denotes magnetic disks (media); 45 denotes servo surfaces; 46 denotes data surfaces; 47 denotes a voice coil motor (hereinafter referred to as "VCM"); 48 denotes actuators; 49 denotes a servo head; 50 denotes data heads; 52 denotes a head assembly; 53 denotes a core slider; 54 denotes a coil; 55 denotes an upper core; and reference numeral 56 denotes a lower core.

§1. Constitution of the Magnetic Disk Subsystem— See FIG. 3

Figure 3:
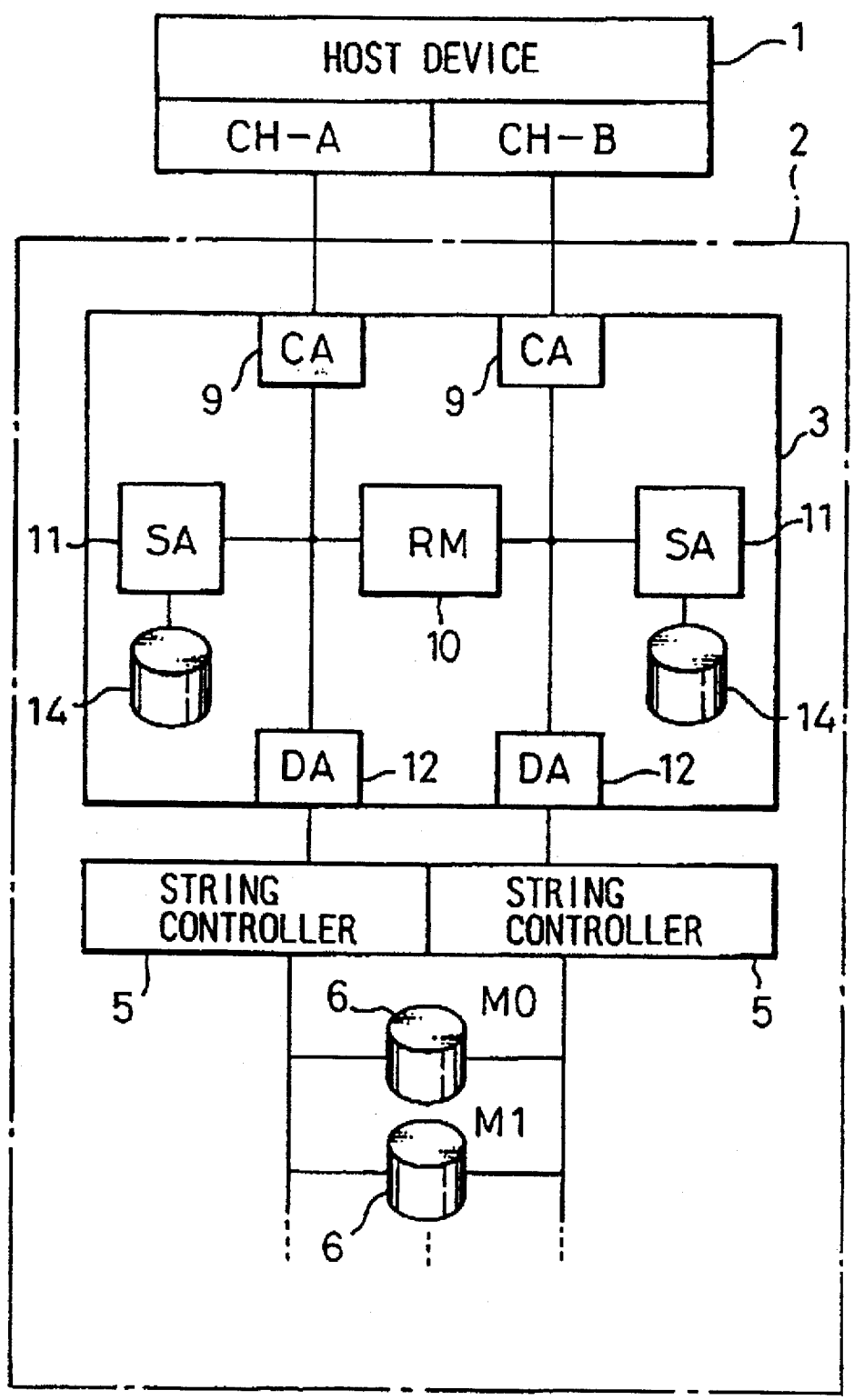
FIG. 3 is a block diagram of a magnetic disk sub system according to a preferred embodiment of the present invention.

FIG. 3 is a block diagram of a magnetic disk subsystem. Constitution of the magnetic disk subsystem will now be described with reference to FIG. 3.

As shown in FIG. 3, the magnetic disk subsystem 2 of this embodiment is constituted by the magnetic disk controller 3, a plurality of string controllers connected to the magnetic disk controller 3, and a plurality of drive modules (M0, M1, - - - ) 6 connected to the string controllers 5.

The magnetic disk subsystem 2 is connected to the channels (CH-A, CH-B) of the host device 1. The magnetic disk subsystem 2 is provided with channel adapters (CA) 9, service adapters (SA) 11, resource manager (RM) 10, device adapters (DA) 12, magnetic disk drives 14, etc.

In this case, the channel adapters (CA) 9, service adapters (SA) 11, device adapters (DA) 12 and magnetic disk drives 14 are duplex, and each component consists of two units that have the same functions. The above-mentioned portions will now be described.

(1) The channel adapter (CA) 9 effects a variety of interface controls relative to the channel.

(2) The service adapter (SA) 11 controls the power supply, controls the operator panel and controls the magnetic disk drive 14.

(3) The resource manager (RM) 10 manages resources (memory unit, file, etc) in the magnetic disk controller and manages the job received from the host computer 1.

(4) The device adapter (DA) 12 effects a variety of controls relative to the drive modules 6 via the string controller 5.

(5) The magnetic disk drive 14 stores programs and a variety of data used by the magnetic disk controller. The program used by the device adapter (DA) is stored in the magnetic disk drive 14 and is read out when the power supply is activated.

(6) The string controller 5 controls a plurality of drive modules 6 based on an instruction from the device adapter (DA) 12.

(7) The drive module 6 rotates the magnetic disk, so that the data are written into, or read out from, the magnetic disk.

§2. Constitution of the Drive Module—See FIG. 4

FIG. 4 is a block diagram of the drive module. Constitution of the drive module shown in FIG. 3 will now be described with reference to FIG. 4.

The drive module 6 is provided with the logic circuit 17, read/write circuit 18, dummy write control circuit 19, servo circuit 20 and DE 21.

The logic circuit 17 is provided with the interface control unit 23, read/write control unit 24, servo control unit 25, sector pulse counting unit 26 and detecting unit of position of rotation (i.e., rotational position detecting unit) 27 which is further provided with a sector pulse generating circuit 28.

The servo circuit 20 is provided with a positioning control unit 30, a rotation control unit 31, a reference clock generating circuit 32, an index generating circuit 33, and a servo demodulation circuit 34. The above-mentioned portions will now be described.

(1) The interface control unit 23 effects the interface controls (such as an exchange of command, a demodulation of command, a transfer of data and various controls in the logic circuit 17) relative to the string controller 5 (or substantially, relative to the device adapter 12).

Upon receiving a command exclusively for dummy writing (dummy write start signal) issued from the device adapter (DA) 12 shown in FIG. 3, the interface control unit 23 sends the command to the dummy write control circuit 19.

(2) The read/write control unit 24 effects a variety of read/write control operations according to the instructions from the interface control unit 23.

(3) The servo control unit 25 effects control operations in the servo circuit 20 according to the instructions from the interface control unit 23.

(4) The rotational position detecting unit 27 detects a rotational position of the medium based upon the data from the read/write control unit 24 and the servo control unit 25, and sends the detected data to the interface control unit 23.

(5) The read/write circuit 18 demodulates the data that are read out and writes the data according to the instructions from the read/write control unit 24.

(6) The DE 21 is equipped with a magnetic disk (medium), a spindle motor, a VCM (voice coil motor), a head, a head IC and the like, and reads the data from, or writes the data into, the magnetic disk.

(7) The positioning control unit 30 controls the VCM provided in the DE 21, and effects the head positioning control operation (seek control, on-track control, etc.).

(8) The rotation control unit 31 controls the rotation of the spindle motor provided in the DE 21.

(9) The servo demodulation circuit 34 demodulates the servo signal (servo signal read by the servo head from the servo surface of the medium) output from the DE 21, sends data for forming index to the index generating circuit 33, and sends synchronizing data to the reference clock generating circuit 32.

(10) The reference clock generating circuit 32 is constituted by a PLL circuit and generates reference clocks in synchronism with synchronizing data sent from the servo demodulation circuit 34. The thus generated reference clocks are sent to the sector pulse generating circuit 28, index generating circuit 33 and dummy write control circuit 19.

(11) The index generating circuit 33 generates an index signal after every turn of the medium, based on the reference clock generated by the reference clock generating circuit 32 and the data for forming index sent from the servo demodulation circuit 34. The generated index signal is sent to the sector pulse generating circuit 28 and to the sector pulse counting unit 26.

(12) Based on the index signal from the index generating circuit 33, the sector pulse generating circuit 28 generates a sector pulse after a predetermined interval from the reference clock generated by the reference clock generating circuit 32. In this case, the start point is an index signal, and the sector pulse is generated by counting up the internal counter using reference clocks.

(13) The sector pulse counting unit 26 is a circuit for counting up the sector pulses. When the counted value reaches a value N1 that has been set in advance, the sector pulse counting unit 26 outputs a set signal of a high level. The counting operation is further continued, and when the counted value reaches a value N2 (N1<N2) that has been set in advance, the sector pulse counting unit 26 outputs a reset signal of a low level.

For instance, the sector pulses are counted up along the circumference of the medium starting with the index signal. At a moment when the counted value has reached N1, the sector pulse counting unit 26 outputs a set signal of a high level.

Then, when the counted value of the sector pulses reaches N2 at a given timing, the sector pulse counting unit 26 outputs a reset signal of a low level. The set signal and reset signal are supplied to the dummy write control circuit 19.

(14) The dummy write control circuit 19 receives the set signal and reset signal from the sector pulse counting unit 26, reference clock from the reference clock generating circuit 32 and dummy write start signal (command exclusively for dummy writing) from the device adapter (DA) 12, and effects the control operation during the dummy writing.

During the ordinary read/write operation, the dummy write control circuit 19 connects the output of the read/write circuit 18 to DE 21. When the dummy write start condition is satisfied, the dummy write control circuit 19 cuts off the connection between the output of the read/write circuit 18 and DE 21, and connects the output of the reference clock generating circuit 32 to DE 21.

The head switching signal (head switching command) from the device adapter (DA) 12 is sent in the order of the string controller 5, the interface control unit 23, the read/write control unit 24, the read/write circuit 18, the dummy write control circuit 19, and the DE 21, and finally the head is changed over in the DE 21.

The dummy write control circuit 19 allows the reference clock to pass through when the set signal from the sector pulse counting unit 26 and the dummy write start signal from the device adapter 12 are both of high level (both signals are assuming high level), and sends the reference clock as a dummy write signal to the DE 21.

In the DE 12, the dummy write signal that is input is converted into a write current through the head IC in the DE, and the dummy writing is effected into the medium.

§3. Device Adapter (DA)—See FIGS. 5A and 5B

Figure 5A:
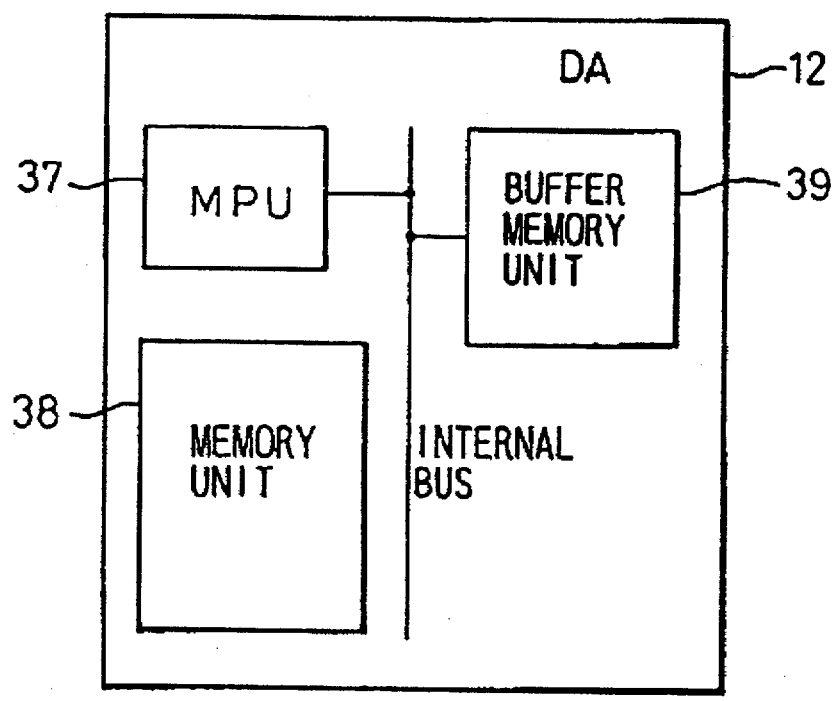
FIGS. 5A and 5B are diagrams explaining a device adaptor according to the preferred embodiment of the present invention.
Figure 5B:
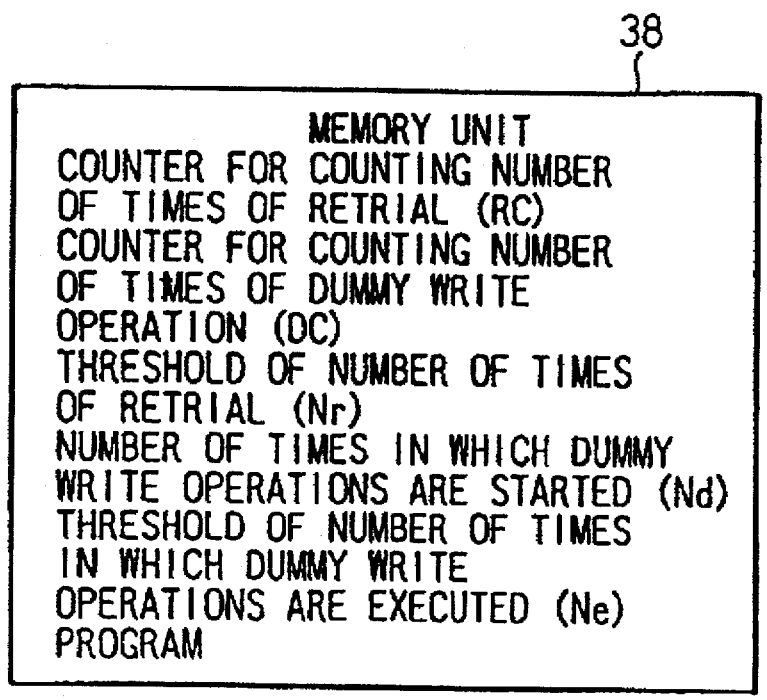

FIGS. 5A and 5B are diagrams illustrating the device adapter (DA), wherein FIG. 5A is a block diagram of the device adapter and FIG. 5B is a diagram of the memory unit. The device adapter (DA) shown in FIG. 3 will now be described with reference to FIGS. 5A and 5B.

The device adapter (DA) 12 is provided with the MPU (microprocessor) 37, memory unit 38 and buffer (buffer memory unit) 39. The MPU 37 effects a variety of control operations in the device adapter 12. The memory unit 38 and the buffer 39 are accessible from the MPU 37.

In the memory unit 38 have been stored in advance a counter for counting the number of times of retrial RC, a counter for counting the number of times of dummy write operation DC, a threshold of the number of times of retrial Nr, a number of times of starting the dummy write operation Nd, a threshold of the number of times of executing the dummy write operation Ne, programs executed by the MPU 37, etc.

In the buffer 39 have been stored data of ID portion read out from the medium by the MPU 37 when the data check retry sequence is executed.

The counter for counting the number of times of retrial RC, the counter for counting the number of times of dummy write operation DC, the threshold of the number of times of retrial Nr, the number of times of starting the dummy write operation Nd, the threshold of the number of times of executing the dummy write operation Ne, and data of programs executed by the MPU 37 that are to be stored in the memory unit 38, are stored in the magnetic disk drive 14 shown in FIG. 3, and are read out by the service adapter (SA) from the magnetic disk drive 14 in response to the instruction from the resource manager 10, when the power supply is activated, and are loaded into the memory unit 38 in the device adapter (DA) 12.

The counter for counting the number of times of retrial RC and the counter for counting the number of times of dummy write operation DC in the memory unit 38 are software counters which are managed (increased, cleared, etc.) by the MPU 37.

§4. Head—See FIGS. 6A, 6B, 7A, 7B and 7C

Figure 6A:
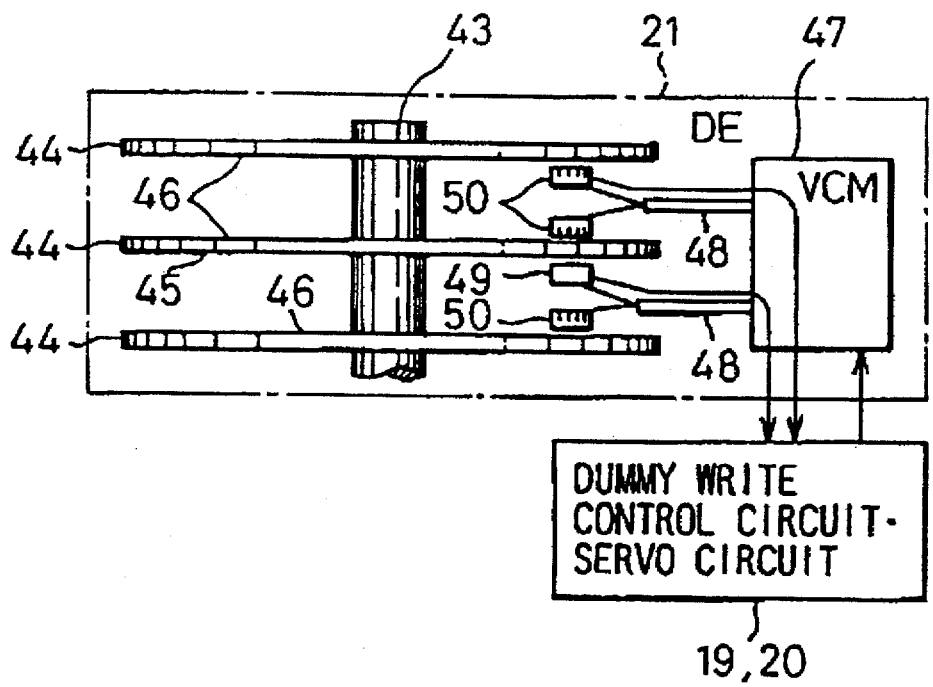
FIGS. 6A and 6B are diagrams 1 of a head according to the preferred embodiment of the present invention.
Figure 6B:
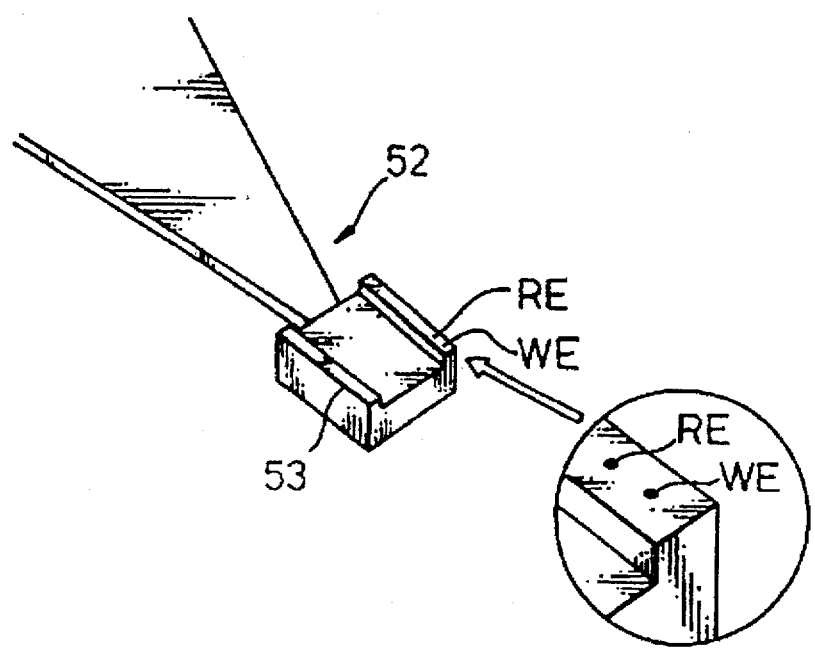
Figure 7A:
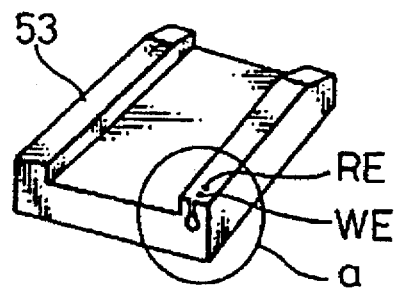
FIGS. 7A, 7B and 7C are diagrams 2 of a head according to the preferred embodiment of the present invention.
Figure 7B:
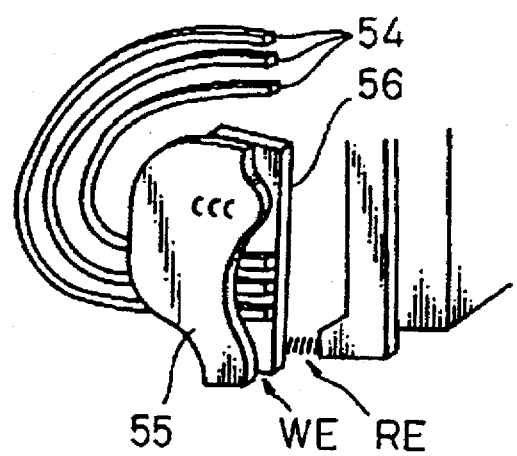
Figure 7C:
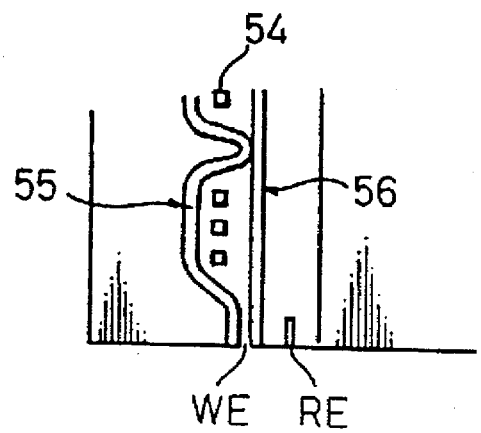

FIGS. 6A and 6B are diagrams 1 illustrating the head, wherein FIG. 6A illustrates the DE; and FIG. 6B illustrates the head assembly. FIGS. 7A to 7C are diagrams 2 illustrating the head, wherein FIG. 7A is a diagram illustrating a core slider on an enlarged scale; FIG. 7B is a diagram illustrating a portion a of FIG. 7A on an enlarged scale; and FIG. 7C is a diagram illustrating a portion of FIG. 7B on an enlarged scale.

The MR head as described above, a head utilizing (magneto-resistance effect) will now be described with reference to FIGS. 6A to 7C.

Referring to FIG. 6A, the DE 21 in the drive module includes a plurality of magnetic disks (media) 44 that are coupled to the spindle 43 and are driven by the spindle motor.

The servo surface 45 is provided on one surface of any one of these plurality of magnetic disks 44, and the surfaces of other magnetic disks 44 are all serving as data surfaces 46.

The actuators 48 driven by the VCM 47 are provided with a plurality of magnetic heads via head arms. Among these magnetic heads, the magnetic head on the side of the servo surface 45 serves as a servo head 49 and the magnetic heads on the side of the data surfaces 46 all serve as data heads 50.

The servo head works to read the servo data from the servo surface 45. The servo data, that are read out, are sent to the servo demodulation circuit 34 in the servo circuit 20 shown in FIG. 4 and are demodulated.

The demodulated servo data are used for controlling the head positioning operation by the head positioning control unit 30 and for effecting the dummy writing (which will be described later) being controlled by the dummy write control circuit 19. The data heads 50 work to read data from, and write data into, the data surfaces 46 of the magnetic disks 44.

Here, the servo head 49 and the data heads 50 are made up of MR heads. The MR head will now be described.

Referring to FIG. 6B, the head assembly 52 constituting the servo head 49 or the data head 50 is provided, at its tip portion, with a core slider 53 which includes a write element (magnetic pole of an inductive write head) WE and a read element (MR element) RE which are spaced apart maintaining a predetermined distance.

Referring to FIGS. 7A to 7C, furthermore, a coil 54 for supplying a write current is provided near the write element WE and the read element RE, and an upper core 55 and a lower core 56 are provided with the coil 54 being interposed between them.

To write the data, the head uses the write element WE to write data into the medium. To read the data, the head uses the read element RE to read the data from the medium.

§5. Data Check Retry Sequence and Dummy Write Process

When a read error (in data check process) occurs in the read process instructed to the drive module 6, the MPU 37 in the device adapter (DA) 12 executes the process of data check retry sequence.

In this case, the MPU 37 issues an instruction to the drive module 6 so that the process for reading the data is executed until the normal read process is finished within a predetermined number of times.

When the read process is not successful even after the data check retry sequence is repeated a given number of times, a write command (dummy write command) is issued to position the data (seek operation) on a cylinder (dummy write cylinder) exclusively for dummy writing that has been formed in advance in the magnetic disk of the drive module 6 and to change the state of the head, and the dummy write process is executed.

After the dummy writ& process is finished, the head is positioned on the original cylinder (seek operation) and the retry sequence is resumed for checking the original data.

In the process for reading data from the magnetic disk of the drive module 6, when the data are not correctly read out, the data check retry sequence is executed as described above. During the data check retry sequence, the predetermined dummy write cylinder is sought to execute the data write (dummy write) process, whereby the state of the head is changed and the head is recovered to the normal state.

§6. Data Check Retry Sequence by a Flowchart—See FIG. 8

Figure 8:
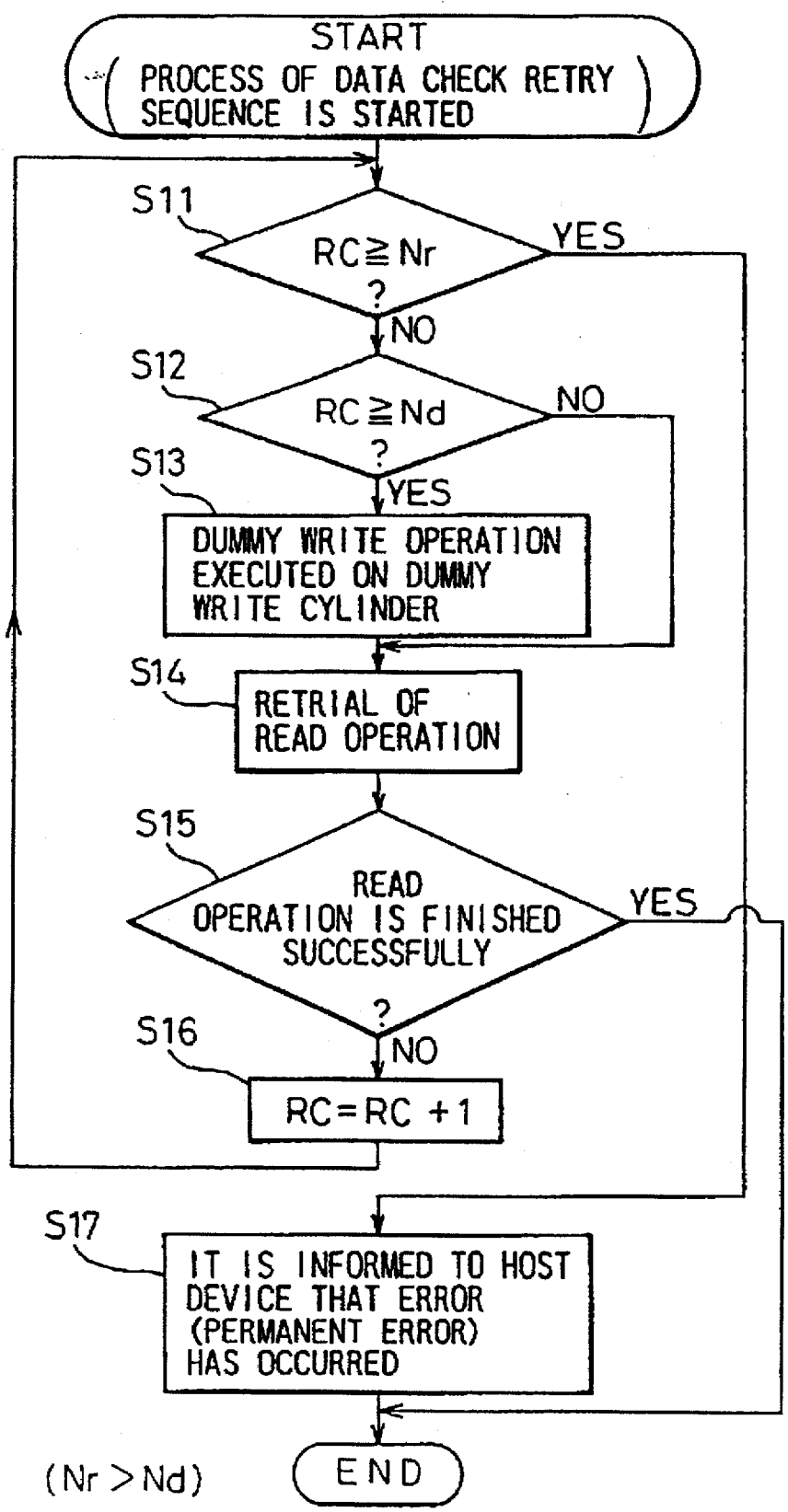
FIG. 8 is a flowchart of a data check retry process according to the preferred embodiment of the present invention.

FIG. 8 is a flowchart explaining the data check retry process. The data check retry process will now be described with reference to FIG. 8. This process is executed being controlled by the MPU 37 in the device adapter (DA) 12, and wherein S11 to S17 denote processing steps.

In this process, the MPU 37 executes the control operation using the counter for counting the number of times of retrial RC, the threshold of the number of times of retrial Nr and the number of times of starting the dummy write operations Nd that are stored in the memory unit 38 in the device adapter 12. In this case, there holds a relation Nr>Nd. The counter for counting the number of times of retrial, RC is cleared when the MPU 37 starts the data check retry process.

First, when the process of data check retry sequence is started, the MPU 37 compares a value of the counter for counting the number of times of retrial RC with a value of the threshold of the number of times of retrial Nr (RC≧Nr or not) (S11).

When the value of the counter for counting the number of times of retrial RC is not, reaching the value of the threshold of the number of times of retrial Nr, the MPU 37 then compares the value of the counter for counting the number of times of retrial RC with the number of times of starting the dummy write operation Nd (RC≧Nd or not) (S12).

Consequently, when the value of the counter for counting the number of times of retrial RC is larger than the number of times of starting the dummy write operation Nd, the MPU 37 executes the dummy writing (which will be described later) into the dummy write cylinder (S13) and, then, returns the process back to the data check retry sequence to retry the read process (S14).

When the value of the counter for counting the number of times of retrial RC is not reaching the number of times of starting the dummy write operation Nd, however, the MPU 37 does not execute the dummy write process but retries the read process (S14).

Next, the MPU 37 determines whether or not the read operation is finished successfully (S15) during the retrial of the read process. When the read operation is finished successfully, the data check retry process is finished. When the read operation is not successful, however, the MPU 37 increases the value of the counter for counting the number of times of retrial RC (RC=RC+1) (S16) and repeats the process from the step S11.

When the read operation is not successful despite the above-mentioned process, and the value of the counter for counting the number of times of retrial RC becomes larger than the threshold of the number of times of retry Nr, the MPU 37 informs the host device of this event as an error (permanent error) (S17).

In the above-mentioned process, the number of times of starting the dummy write operation Nd may not be only one value. Instead of this process, a plurality of numbers of times of starting the dummy write operation may be set like Nd1, Nd2, - - - (Nd1<Nd2< - - - ), and the dummy write process may be started only when the values of the counter for counting the numbers of times of retrial RC have reached the numbers of times of starting the dummy write operation Nd1, Nd2, Nd3, - - - .

In this case, any given number of times may be set like Nd1=10 (10 times), Nd2=20 (20 times), - - - . The numbers of times of starting the dummy write operation are stored in advance in the memory unit 38 and are processed by the MPU 37.

The head characteristics are recovered at higher probability when the dummy write process is executed after the numbers of times of starting the dummy write operation Nd1, Nd2, Nd3, - - - are attained, compared with the case in which the dummy write process is executed every time when the predetermined number of times of starting the dummy write operation Nd is attained.

§7. Dummy Write Process (No. 1) (Dummy Write Cylinder and Change-over of Head)

Figure 9A:
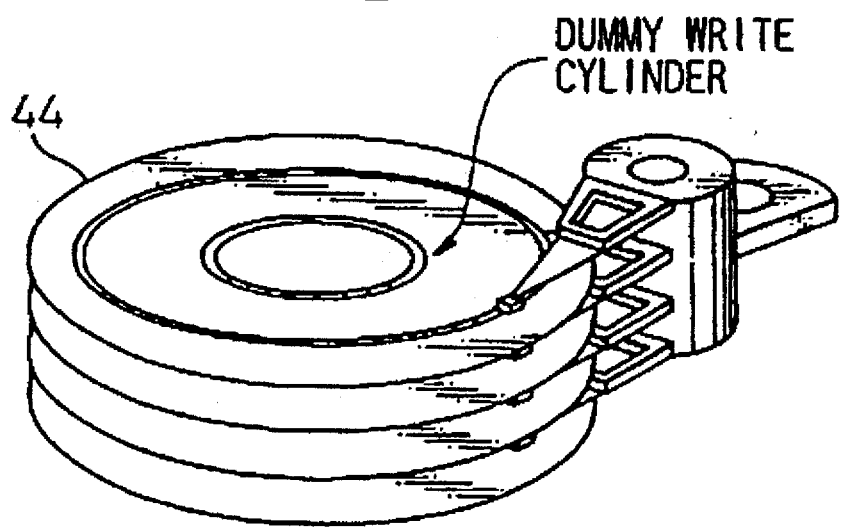
FIGS. 9A and 9B are diagrams (No. 1) for explaining the dummy write process according to the preferred embodiment of the present invention.
Figure 9B:
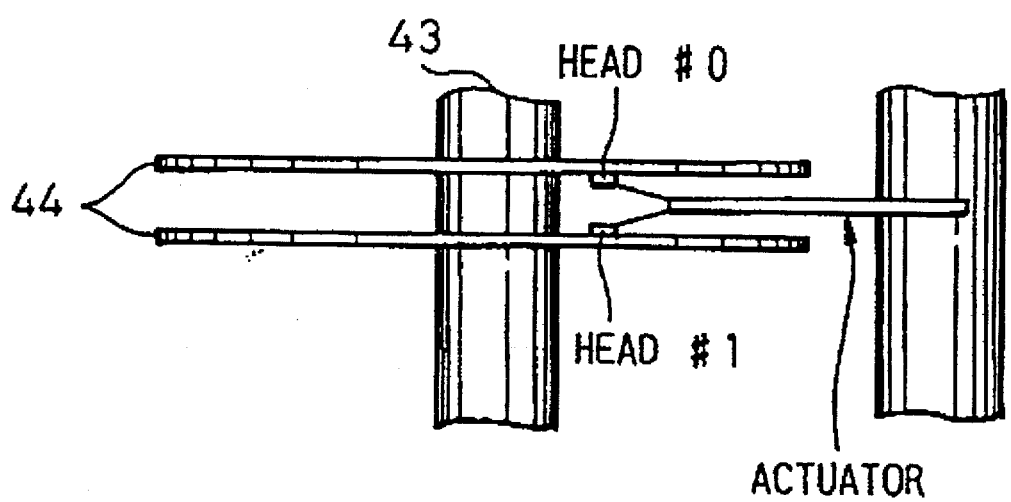

FIGS. 9A and 9B are diagrams No. 1 for explaining the dummy write process, wherein FIG. 9A is a diagram for explaining the dummy write cylinder, and FIG. 9B is a diagram for explaining the change-over of head during the dummy write operation.

When the dummy write process is to be effected, the magnetic disk is provided with a cylinder exclusively for dummy writing, and the head is positioned on this exclusive cylinder to effect the dummy write operation. That is, the user data may be erased when the write process is effected using the user cylinder. For this reason, an exclusive cylinder (or dedicated cylinder) is used as described above.

In this embodiment as shown in FIG. 9A, among the cylinders of the magnetic disks 44, the cylinder on the inside of the user cylinders is used as the one exclusively for dummy writing (dummy write cylinder).

In the process for positioning the head on the dummy write cylinder, furthermore, whether or not the seek process is normally finished is confirmed by reading the ID portion of record on the cylinder on which the head is positioned and by reading the address data written in the ID portion.

When the dummy writing is effected, however, the ID portion cannot be normally read since the characteristics of the head have deteriorated. As shown in FIG. 9B, therefore, a head assembly having two heads (#0, #1) mounted on an actuator is used, and the head is changed over to read the ID portion.

In this case, during the seeking operation, the heads #0 and #1 are located on the same cylinder position of the medium. Therefore, even when the head #1 is positioned on the dummy write cylinder to effect the dummy writing, it is not allowed to read the ID portion for confirming the positioning by using the head #1.

Therefore, the head is changed from the head #1 over to the head #0 to read the ID portion of the dummy cylinder using the head #0, in order to make sure whether or not the seek process is normally finished through the process for positioning the head on the dummy write cylinder.

After it is confirmed that the head is properly positioned on the dummy write cylinder, the head #1 is selected to effect the dummy writing into the dummy write cylinder.

§8. Dummy Write Process (No. 2) (In the Drive Modules)—See FIGS. 10 and 11

Figure 11:
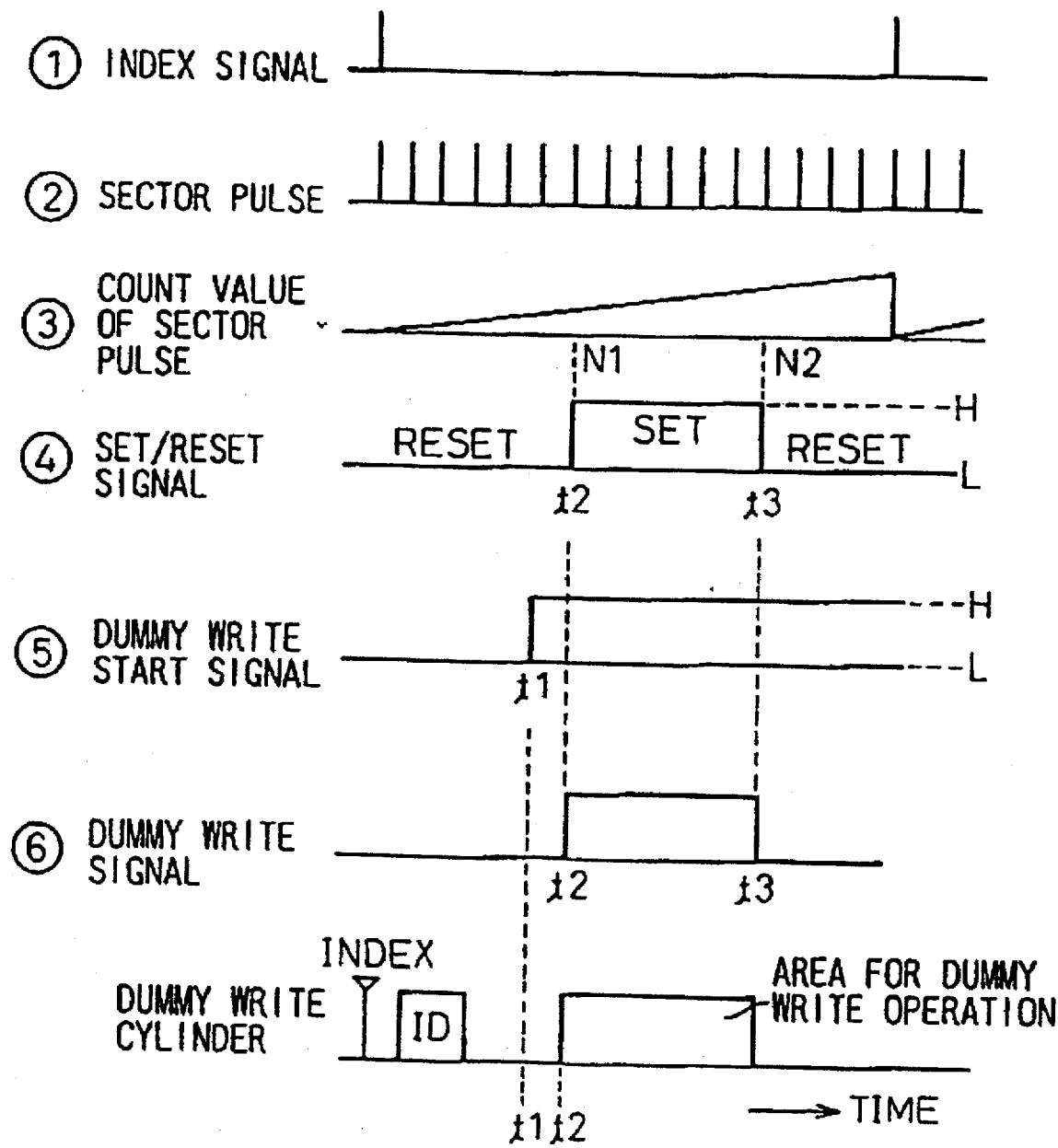
FIG. 11 is a diagram (No. 3) for explaining the dummy write process according to the preferred embodiment of the present invention.

FIG. 10 is a diagram No. 2 illustrating the dummy write process, and FIG. 11 is a diagram No. 3 illustrating the dummy write process (time chart of each of the portions shown in FIG. 10). The dummy write process in the drive modules executed as instructed by the MPU 37 will now be described with reference to FIGS. 10 and 11.

FIG. 10 is a diagram illustrating only those portions related to the dummy write process in the drive modules 6 shown in FIG. 4, and wherein signals from various units are denoted by ① to ⑥. In FIG. 11, furthermore, the time charts of signals of the units are denoted by ① to ⑥.

In this process, the MPU 37 in the device adapter (DA) 12 issues a dummy write start signal as a command exclusively for dummy writing thereby to execute the dummy write process.

A servo demodulation circuit 34 demodulates the servo signal output from the DE 21, sends data for forming index to the index generating circuit 33 and further sends synchronizing data to the reference clock generating circuit 32. The servo signal is the one obtained by reading servo data written in the servo surface of the medium using the servo head in the DE 21.

The reference clock generating circuit 32 is constituted by a PLL circuit and generates reference clocks in synchronism with the synchronizing data sent from the servo demodulation circuit. The thus generated reference clocks are sent to the sector pulse generating circuit 28, to the index generating circuit 33 and to the dummy write control circuit 19.

The index generating circuit 33 generates an index signal after every turn of the medium, based on the reference clock generated by the reference clock generating circuit 32 and the data for forming index sent from the servo demodulation circuit 34.

The index signal is an index (INDEX) signal denoted by ① in FIG. 11, and is sent to the sector pulse generating circuit 28 and to the sector pulse counting unit 26.

Based on the index signal from the index generating circuit 33, the sector pulse generating circuit 28 generates a sector pulse after a predetermined interval from the reference clock generated by the reference clock generating circuit 32.

In this case, the start point is an index signal, and a sector pulse denoted by ② in FIG. 11 is generated by counting up the internal counter based on the reference clocks.

The sector pulse counting unit 26 counts up the sector pulses with the index signal as a reference. When the count value reaches a predetermined value N1 that has been set in advance, the sector pulse counting unit outputs a set signal of a high level. The counting operation is further continued and when a predetermined value N2 (N1<N2) is attained, the sector pulse counting unit 26 outputs a reset signal of a low level.

For instance, as denoted by ③ in FIG. 11, the sector pulses are counted up along the circumference of the medium starting with the index signal. At the time t2 when the counted value has reached N1, the sector pulse counting unit 26 outputs a set signal of a high level as denoted by ④.

Then as the counted value of the sector pulses reaches N2 at the time t3, the sector pulse counting unit 26 outputs a reset signal of a low level. In this example as denoted by ⑤, a dummy write start signal of a high level is output at the time t1 (which is slightly earlier than the time t2) that has passed through the ID portion to some degree.

The set signal and reset signal output from the sector pulse counting unit 26 are sent to the dummy write control circuit 19. The dummy write control circuit 19 receives the set signal and reset signal from the sector pulse counting unit 26, reference clock from the reference clock generating circuit 32 and dummy write start signal from the device adapter (DA) 12, and effects the control operation during the dummy writing.

In this control operation, the reference clock is permitted to pass through when the set signal from the sector pulse counting unit 26 denoted by ④ and the dummy write start signal from the device adapter 12 denoted by ⑤ are both of high level (both signals are assuming high level) (timing t2), and the reference clock is sent as a dummy write signal denoted by ⑥ to the DE 21.

In the DE 21, the dummy write signal is converted to a write current by the head IC in the DE, and the dummy writing is effected into the medium.

In the dummy write cylinder, therefore, the dummy writing is effected in the dummy write region (i.e., area for dummy write operation) which is slightly separated away from the ID portion without effecting the dummy writing into the ID portion. During the dummy writing, therefore, the circuit shown in FIG. 10 can prevent the ID portion of the dummy cylinder from being destroyed.

§9. Dummy Write Process by the Flowchart—See FIGS. 12 and 13

Figure 12:
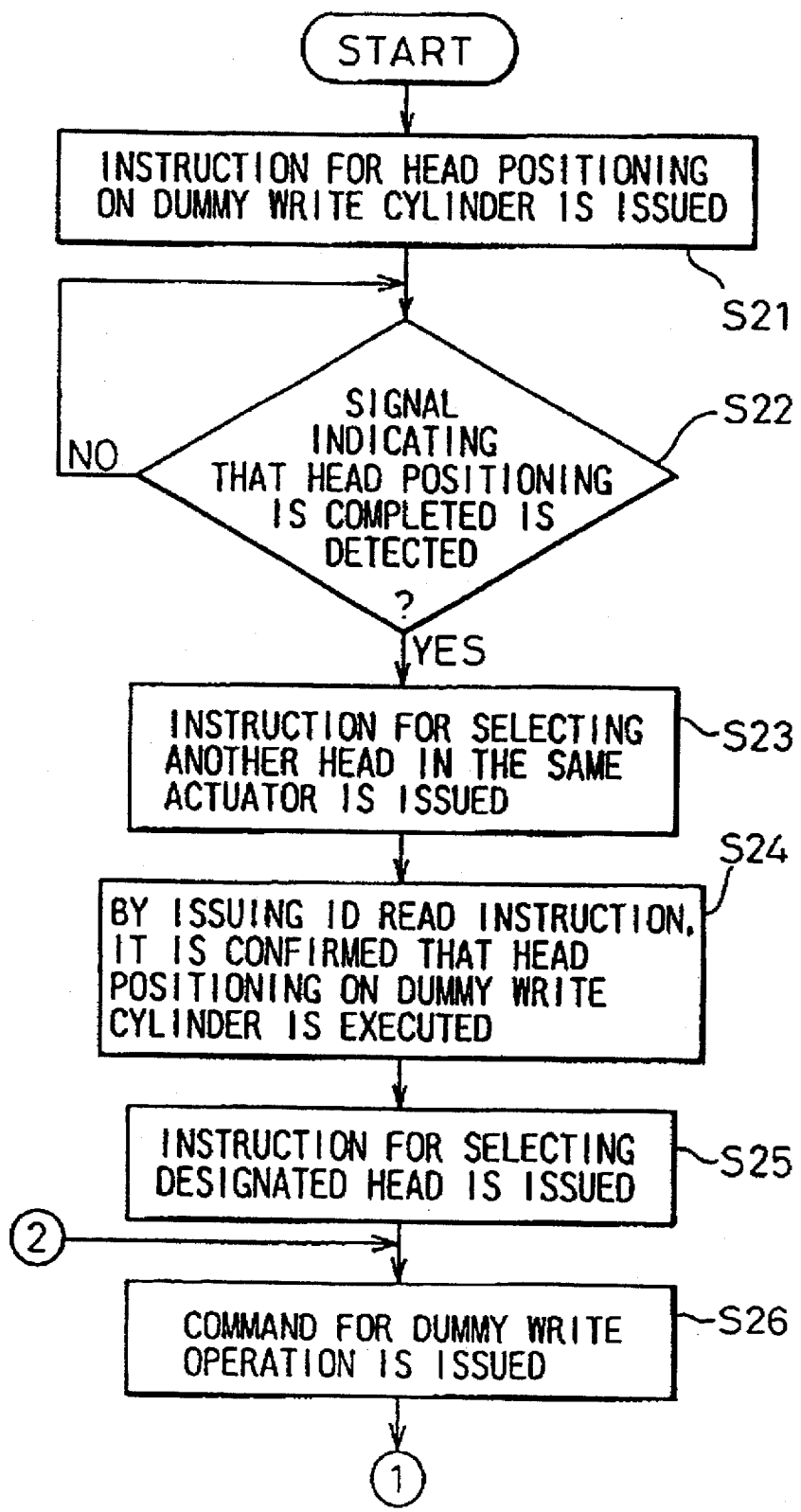
FIG. 12 is a flowchart (No. 1) of dummy write process according to the preferred embodiment of the present invention.
Figure 13:
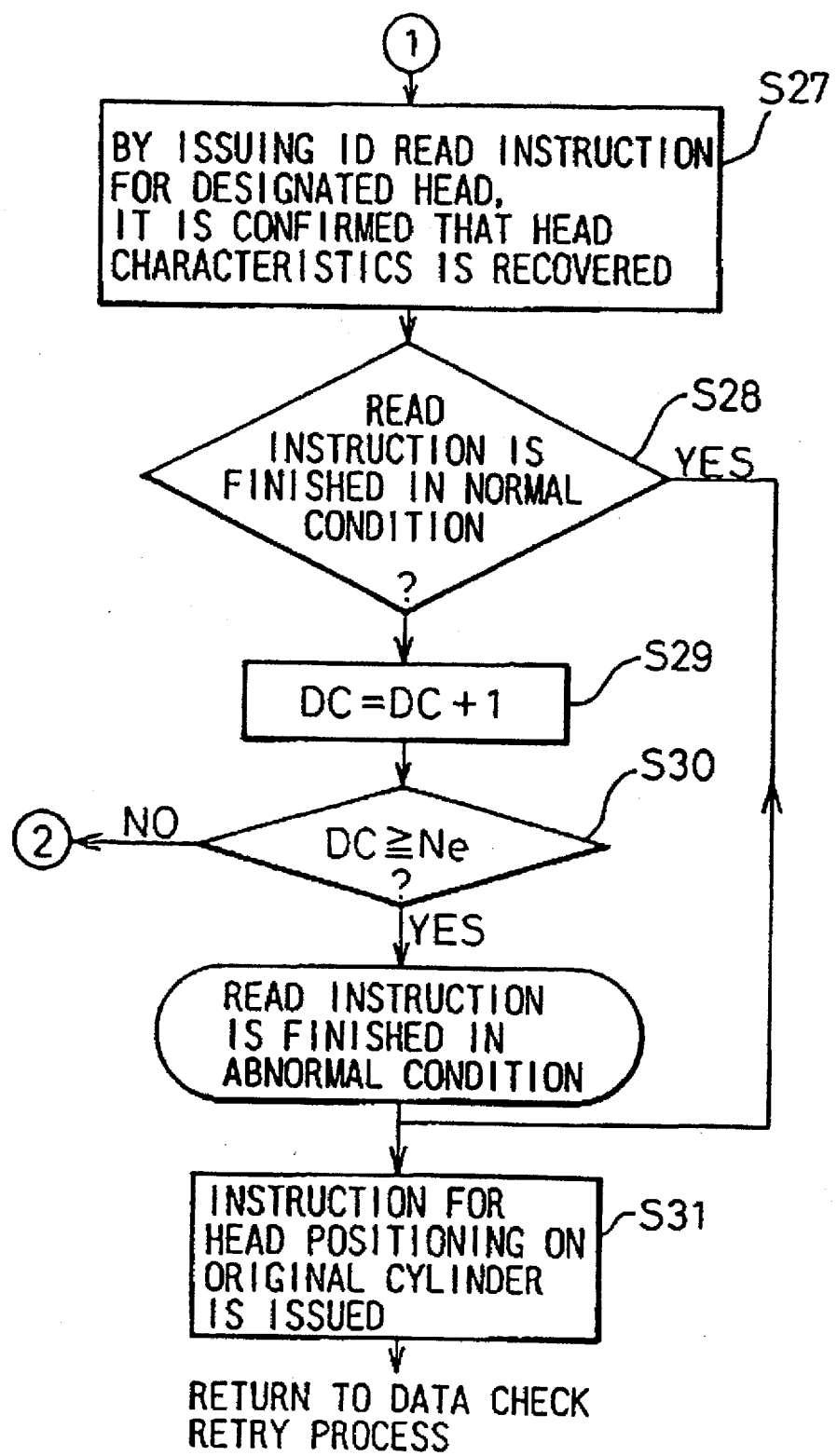
FIG. 13 is a flowchart (No. 2) of dummy write process according to the preferred embodiment of the present invention.

FIG. 12 is a flowchart No. 1 for dummy write process and FIG. 13 is a flowchart No. 2 for dummy write process. The dummy write process will now be described with reference to FIGS. 12 and 13, and wherein S21 to S31 denote processing steps.

This process is executed, being controlled by the MPU 37 in the device adapter 12, and the memory unit 38 in the device adapter (DA) 12 is provided with the counter for counting the number of times of dummy write operation DC and the threshold of the number of times of executing the dummy write operation Ne (threshold of the number of times of repeating the dummy write operation).

First, as the dummy write process is started, the MPU 37 issues to the drive module 6 an instruction for positioning the head on the dummy write cylinder (S21). In response to this instruction, the drive module 6 seeks the dummy write cylinder and positions the head.

After the positioning is finished, the drive module 6 generates an interrupt to the device adapter (DA) 12 and reports that the positioning process is completed.

Then, upon detecting the positioning completion signal indicating that the positioning process is completed due to the interrupt from the drive module 6 (S22), the MPU 37 issues an instruction for selecting another head in the same actuator.

In the head shown in FIG. 9B, for instance, when the head #1 for effecting the dummy writing has deteriorated in its characteristics and is no longer capable of reading the ID portion for confirming the positioning, then, the normal head (another head) #0 at the same cylinder position must be selected to read the ID portion.

Therefore, the MPU 37 issues a head select instruction for selecting the head #0 (S23). When the head select instruction is issued as described above, the drive module 6 changes the head over to the head #0.

In such a state, the MPU 37 issues the ID read instruction to the drive module 6 to read the ID portion from the medium and confirms the position of the head on the dummy write cylinder (S24).

In this case, when the ID read instruction is issued, the drive module 6 reads the ID portion from the medium (dummy cylinder) using the head #0, and sends the data that are read out to the device adapter (DA) 12.

The MPU 37 of the device adapter (DA) 12 receives the data of ID portion that are read out and stores them in the buffer 39. Relying on the data (address data) of ID portion stored in the buffer 39, the MPU 37 confirms whether or not the head has been accurately positioned on the duty write cylinder.

In this case, the positioning has been confirmed relying on the data of ID portion read out using the head #0. If the positioning is confirmed using the head #0, then, it is deemed that the positioning has been confirmed using the head #1, since the head #0 and the head #1 have been positioned on the same cylinder.

When the positioning of head on the dummy cylinder is formed by reading the ID portion, the MPU 37 issues an instruction for selecting the designated head (head #1) (S25). Upon receiving this instruction, the drive module 6 changes the head over to the head #1.

Thereafter, the MPU 37 issues a dummy write command (i.e., command for dummy write operation) to the drive module 6 to effect the dummy write operation into the dummy write cylinder (S26). Upon receipt of this command, the drive module 6 supplies a write current to the head #1 to effect the writing (dummy writing) into the dummy write cylinder.

In this case, a current of a given frequency is supplied into the head #1 in which the characteristics have deteriorated for a predetermined period of time, in order to remove magnetic distortion from the MR head so that normal reading operation can be carried out. In this dummy writing operation, however, the ID portion is guarded so that no data is written therein. That is, the data are written at positions avoiding the ID portion.

Next, the MPU 37 issues an instruction to the drive module 6 to read the ID portion using the head (head #1) in order to confirm the recovery of characteristics (S27).

Upon receiving the instruction for reading the ID portion, the drive module 6 reads the ID portion from the medium (ID portion of the dummy write cylinder) using the head #1 and transfers the data to the device adapter (DA) 12. In the device adapter (DA) 12 which has received the data, the MPU 37 stores the data of ID portion that are read in the buffer 39.

From the data (address data) of ID portion stored in the buffer 39, the MPU 37 confirms whether or not the ID portion is properly read by the head #1. When the ID portion is properly read in this confirmation process, the MPU 37 determines that the head #1 is recovered by the dummy writing. When the ID portion is not properly read, however, the MPU 37 determines that the head #1 is not recovered.

As described above, the MPU 37 determines whether or not the read instruction is normally finished (S28). When the read instruction is normally finished (ID portion is normally read), then, the head #1 has been recovered. Then, the MPU 37 issues an instruction for positioning the head on the original cylinder (with which checking of data is retried) (S31) and returns the process back to the data check retry process.

When the read instruction has not been normally finished in the process of S28, however, the MPU 37 increases the value of the counter for counting the number of times of dummy write operation DC (DC=DC+1) (S29) and compares the value of the counter for counting the number of times of dummy write operation DC with the threshold of the number of times of executing dummy write operation Ne (DC≧Ne or not) (S30).

When the value of the counter for counting the number of times of dummy write operation DC is larger than the threshold of the number of times of executing dummy write operation Ne, the MPU 37 determines that the process is abnormally finished and informs the host device of abnormal condition (error).

When the value of the counter for counting the number of times of dummy write operation DC is not reaching the threshold of the number of times of executing dummy write operation Ne in the process of S30, however, the process is repeated starting from S26.

§10. Guarding the ID Portion by a Head-switching Instruction (No. 1)

When the dummy write is to be executed, the ID portion of the dummy cylinder must be guarded so as not to be destroyed. That is, if the ID portion is destroyed, then, it is no longer possible to make sure whether or not the head is properly recovered after the dummy writing.

In the above-mentioned embodiment, the ID portion is guarded by the circuits (especially, dummy write control unit 19 and sector pulse counting unit 26) shown in FIG. 10 and by issuing a command exclusively for dummy writing.

In the constitution of FIG. 10, the servo demodulation circuit 34, index generating circuit 33, reference clock generating circuit 32 and sector pulse generating circuit 28 are the components that are necessary for the ordinary process, and are not the components that are particularly provided for effecting the dummy writing.

According to the above-mentioned method, however, a circuit exclusively for dummy writing must be provided and a command exclusively for dummy writing must be issued. Instead of the above-mentioned method, however, the following method can be realized.

In the process shown in FIGS. 12 and 13, for instance, the ID portion is read out by changing the head from the head #1 (having deteriorated characteristics) over to the head #0 (normal head) in order to confirm the position of the head on the dummy write cylinder.

As soon as the process for confirming the positioning is carried out, the head is changed from the head #0 over to the head #1, and the dummy writing is effected into the dummy write cylinder using the head #1. Thus, as soon as the ID portion is read out, a head selection instruction is used and, immediately thereafter, a write command is issued to send a write current for effecting the dummy writing.

According to the above-mentioned method, the dummy writing is effected by changing over the head, i.e., by using the head #1 into the medium at a position separated away from the ID portion without destroying the ID portion on the dummy cylinder. That is, the ID portion is guarded so as not be destroyed by the change of the head (switching of the head).

Figure 14A:
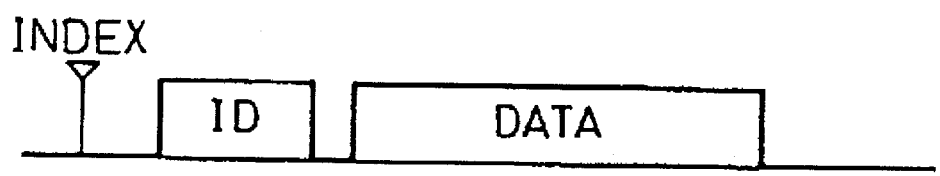
FIGS. 14A and 14B are a diagram for explaining dummy write process by empty read instructions according to the preferred embodiment of the present invention.
Figure 14B:
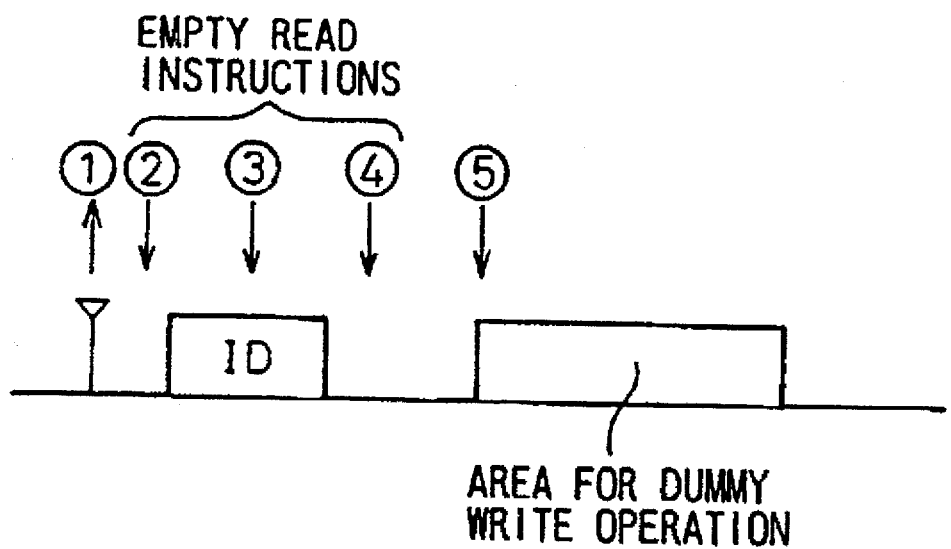

§11. Guarding the ID Portion by Empty Read Instruction—See FIGS. 14A and 14B FIGS. 14A and 14B are diagrams for explaining dummy write process by an empty read instruction, wherein FIG. 14A is a diagram explaining the dummy write cylinder, and FIG. 14B is a diagram explaining the sequence of dummy write process.

This process is executed by using an apparatus shown in FIG. 10 which has neither the dummy write control unit 19 nor the sector pulse counting unit 26, in order to guard the ID portion during the dummy write operation.

In the constitution of FIG. 10, the servo demodulation circuit 34, index generating circuit 33, reference clock generating circuit 32 and sector pulse generating circuit 28 are the components which are necessary for the ordinary process, and are not the components that are particularly provided for effecting the dummy writing.

That is, in effecting the dummy write process, the head is positioned on the dummy write cylinder to effect the dummy writing. In this case, when the ID portion is destroyed by the dummy writing, it becomes no longer possible to confirm whether or not the head is recovered to the normal state after the dummy writing.

During the dummy write operation, therefore, the ID portion of the dummy write cylinder is prevented from being destroyed, and the dummy writing is effected into the medium at a portion which is slightly separated away from the ID portion. This process will now be described.

As shown in FIG. 14A, the medium has an index for every turn thereof and has an ID portion at a position which is slightly separated away from the index. A data portion for writing data therein exists behind the ID portion.

As described above, the dummy writing is effected into a predetermined region (area for dummy write operation) of the data portion so that the ID portion will not be destroyed. For this purpose, the following process is carried out.

First, in order not to destroy the ID portion of a track that will be traced by the head (head #1) having deteriorated characteristics, the MPU 37 issues an instruction for selecting the head #1 to the drive module 6 (process of S25 of FIG. 12) and then issues to the drive module 6 an instruction for detecting the index of the track.

Upon detecting the index as a result of receiving the above-mentioned instruction, the drive module 6 sends an index detection signal to the device adapter (DA) 12. Upon receiving the index detection signal, the MPU 37 issues to the drive module 6 empty read instructions which are long enough to skip over the ID portion.

As shown in FIG. 14B, for example, when the index signal is detected at ①, the empty read instructions are issued in the order of ②, ③ and ④. The empty read instructions are simply to carry out the empty read operation, and do not destroy the ID portion.

when a position slightly separated away from the ID portion is reached after the ID portion is skipped by the empty read instructions, the MPU 37 issues to the drive module 6 an instruction (write current sending instruction) for effecting the dummy writing at ⑤.

When the instruction for dummy writing is issued, the drive module 6 effects the dummy writing into the medium. By issuing the empty read instructions, it is allowed to effect the dummy writing into the dummy write area by skipping over the ID portion.

Other embodiments will be described hereinafter. In addition to the above-mentioned embodiment, the present invention can be put into practice as described below.

(1) The invention can be similarly adapted to other magnetic disk drives (or subsystems) having configurations different from that of the magnetic disk subsystem of the above-mentioned embodiments.

(2) The invention can be further similarly adapted to even other magnetic disk drives (or subsystems) without having configuration shown in FIG. 10.

While the present invention has been described as related to the preferred embodiments, it will be understood that various changes and modifications may be made without departing from the spirit and the scope of the invention as hereinafter claimed.

We claim:

1. A disk drive comprising:
    a head for writing data into a medium and reading data from said medium;
    positioning means for placing said head at a desired position on the medium; and
    data check retry sequence control means which controls a data check retry sequence for reading the data again using the same head when the data are not correctly read out from the medium in the data read process, wherein said data check retry sequence control means is provided with dummy write means which carries out dummy writing of predetermined data by seeking a predetermined dummy write cylinder during the data check retry sequence, and reads the data again by seeking the original cylinder,
    said data check retry sequence control means being further provided with dummy write start control means which sets a predetermined number of times of starting dummy writing, counts the number of times of data check retry during the data check retry sequence, and starts the dummy writing when the counted number of times have reached the predetermined number of times of starting the dummy writing.

2. A disk drive according to claim 1, wherein said data check retry sequence control means is provided with position confirmation control means which changes a given head over to another head that is positioned on the same cylinder as the dummy write cylinder to read the ID portion from the medium using the other head after the head is changed in order to make sure whether or not the given head has been positioned on the dummy write cylinder.

3. A disk drive according to claim 1, wherein said data check retry sequence control means is provided with head recovery confirmation means which causes a given head that is the object of dummy writing of the data to read the ID portion of the dummy write cylinder in order to make sure that the head has normally recovered.

4. A disk drive according to claim 1, wherein said data check retry sequence control means is provided with dummy write repeat control means which, when an ID portion is not correctly read out as a result of reading the ID portion of the dummy write cylinder using a given head that is the object of dummy writing of the data, effects the dummy writing again into the same head and repeats the dummy writing until the ID portion is normally read out.

5. A disk drive comprising:
    a head for writing data into a medium and reading data from said medium;
    positioning means for placing said head at a desired position on the medium; and
    data check retry sequence control means which controls a data check retry sequence for reading the data again using the same head when the data are not correctly read out from the medium in the data read process, wherein said data check retry sequence control means is provided with dummy write means which carries out dummy writing of predetermined data by seeking a predetermined dummy write cylinder during the data check retry sequence, and reads the data again by seeking the original cylinder,
    said data check retry sequence control means being further provided with empty read instruction issuing means which, when the dummy writing is effected, issues empty read instructions so as not to destroy the ID portion of the dummy write cylinder.

6. A disk drive comprising:
    a head for writing data into a medium and reading data from said medium;
    positioning means for placing said head at a desired position on the medium; and
    data check retry sequence control means which controls a data check retry sequence for reading the data again using the same head when the data are not correctly read out from the medium in the data read process, wherein said data check retry sequence control means is provided with dummy write means which carries out dummy writing of predetermined data by seeking a predetermined dummy write cylinder during the data check retry sequence, and reads the data again by seeking the original cylinder,
    said data check retry sequence control means being further provided with head switch instruction issuing means which, when the dummy writing is effected, issues a head switch instruction to change over said head so as not to destroy the ID portion of the dummy write cylinder.

7. A disk drive comprising:
    a head for writing data into a medium and reading data from said medium;

positioning means for placing said head at a desired position on the medium; and data check retry sequence control means which controls a data check retry sequence for reading the data again using the same head when the data are not correctly read out from the medium in the data read process, wherein said data check retry sequence control means is provided with dummy write means which carries out dummy writing of predetermined data by seeking a predetermined dummy write cylinder during the data check retry sequence, and reads the data again by seeking the original cylinder, wherein said data check retry sequence control means is further provided with write command issuing means exclusively for dummy writing which, when the dummy writing is effected, issues a write command (dummy write start signal) exclusively for dummy writing for which the ID portion need not be read out, so as not to destroy the ID portion of the dummy write cylinder.

8. A method for retrying to check data in a disk drive which comprises a head for writing data into a medium and reading data from said medium, positioning means for placing the head at a desired position on the medium, and data check retry sequence control means which controls a data check retry sequence for reading the data again using the same head when the data are not correctly read out from the medium in the data read process, wherein predetermined data are written in dummy writing by seeking a predetermined dummy write cylinder during the data check retry sequence, and the data are read again by seeking the original cylinder, and wherein the data check retry sequence sets a predetermined number of times of starting dummy writing, counts the number of times of starting dummy writing, counts the number of times of data check retry during the data check retry process, and starts the dummy writing when the counted number of times have reached said predetermined number of times of starting the dummy writing.

9. A method for retrying to check data in a disk drive according to claim 8, wherein the data check retry sequence changes a given head over to another head that is positioned on the same cylinder as the dummy write cylinder to read the ID portion from the medium using the other head after the head is changed, in order to make sure whether or not the given head has been positioned on the dummy write cylinder.

10. A method for retrying to check data in a disk drive according to claim 8, wherein the data check retry sequence causes a given head that is the object of writing of the data to read the ID portion of the dummy write cylinder, in order to make sure whether or not a given head has normally recovered.

11. A method for retrying to check data in a disk drive according to claim 8, wherein, when the ID portion is not correctly read out as a result of reading the ID portion of the dummy write cylinder using a given head that is the object of dummy writing of the data, the data check retry sequence effects the dummy writing again into the same head and repeats the dummy writing until the ID portion is normally read out.

12. A method for retrying to check data in a disk drive which comprises a head for writing data into a medium and reading data from said medium, positioning means for placing said head at a desired position on the medium, and data check retry sequence control means which controls a data check retry sequence for reading the data again using the same head when the data are not correctly read out from the medium in the data read process, wherein predetermined data are written in dummy writing by seeking a predetermined dummy write cylinder during the data check retry sequence, and the data are read again by seeking the original cylinder, and wherein empty read instructions are issued, so that the ID portion of the dummy write cylinder is prevented from being destroyed by the dummy writing.

13. A method for retrying to check data in a disk drive which comprises a head for writing data into a medium and reading data from said medium, positioning means for placing the head at a desired position on the medium, and data check retry sequence control means which controls a data check retry sequence for reading the data again using the same head when the data are not correctly read out from the medium in the data read process, wherein predetermined data are written in dummy writing by seeking a predetermined dummy write cylinder during the data check retry sequence, and the data are read again by seeking the original cylinder, and wherein a head switching instructions is issued for changing over the head, so that the ID portion of the dummy write cylinder is prevented from being destroyed by the dummy writing.

14. A method for retrying to check data in a disk drive which comprises a head for writing data into a medium and reading data from said medium, positioning means for placing the head at a desired position on the medium, and data check retry sequence control means which controls a data check retry sequence for reading the data again using the same head when the data are not correctly read out from the medium in the data read process, wherein predetermined data are written in dummy writing by seeking a predetermined dummy write cylinder during the data check retry sequence, and the data are read again by seeking the original cylinder, and wherein a write command (dummy write start signal) exclusively for dummy writing for which the ID portion need not be read out is issued, so that the ID portion of the dummy write cylinder not be destroyed when the dummy writing is effected.

15. A method for retrying to check data in a disk drive which comprises a head for writing data into a medium and reading data from said medium, positioning means for placing the head at a desired position on the medium, and data check retry sequence control means which controls a data check retry sequence for reading the data again using the same head when the data are not correctly read out from the medium in the data read process, wherein predetermined data are written in dummy writing by seeking a predetermined dummy write cylinder during the data check retry sequence, and the data are read again by seeking the original cylinder, and wherein the dummy write sequence is controlled based on the write command (dummy write start signal) exclusively for dummy writing and based on the sector position data of the medium, so that the ID portion will not be destroyed when the dummy writing is effected.

* * * * *

UNITED STATES PATENT AND TRADEMARK OFFICE
CERTIFICATE OF CORRECTION

PATENT NO. : 5,682,272
DATED : October 28, 1997
INVENTOR(S) : Taroda et al.

It is certified that error appears in the above-identified patent and that said Letters Patent is hereby corrected as shown below:

Column 1, line 61, delete "when" and insert

--When-- therefor

Column 2, line 2, delete "counter" and insert

--counter,-- therefor

Column 3, line 57, after "cylinder" start a new paragraph

Column 4, line 42, delete "but" and insert

--out-- therefor

Column 5, line 6, delete "area" and insert

--areas-- therefor

UNITED STATES PATENT AND TRADEMARK OFFICE
CERTIFICATE OF CORRECTION

PATENT NO. : 5,682,272
DATED : October 28, 1997
INVENTOR(S) : Taroda et al.

It is certified that error appears in the above-identified patent and that said Letters Patent is hereby corrected as shown below:

Column 5, line 35, delete "head-" and insert --head-- therefor

Column 6, line 51, delete "a diagram" and insert --diagrams-- therefor

Column 7, line 12, delete "&he" and insert --the-- therefor

Column 8, line 15, delete "circuit)" and insert --circuit;-- therefor

Column 8, line 38, after "String controllers" insert --5--

UNITED STATES PATENT AND TRADEMARK OFFICE
CERTIFICATE OF CORRECTION

PATENT NO. : 5,682,272
DATED : October 28, 1997
INVENTOR(S) : Taroda et al.

It is certified that error appears in the above-identified patent and that said Letters Patent is hereby corrected as shown below:

Column 12, line 44, delete "write&" and insert -- write-- therefor

Column 13, line 9, delete "not, reaching" and insert --not reaching-- therefor

Column 16, line 48, delete "duty" and insert --dummy-- therefor

Column 18, line 27, after "as" insert --to--

Column 19, line 18, delete "when" and insert --When-- therefor

Signed and Sealed this

Fifteenth Day of September, 1998

Attest:

BRUCE LEHMAN

Attesting Officer

Commissioner of Patents and Trademarks